United States Patent
Kandur Raja et al.

(10) Patent No.: US 10,831,283 B2
(45) Date of Patent: Nov. 10, 2020

(54) METHOD AND ELECTRONIC DEVICE FOR PREDICTING A RESPONSE FROM CONTEXT WITH A LANGUAGE MODEL

(71) Applicant: SAMSUNG ELECTRONICS CO., LTD., Suwon-si (KR)

(72) Inventors: Barath Raj Kandur Raja, Bangalore (IN); Balaji Vijayanagaram Ramalingam, Bangalore (IN); Harshavardhana Poojari, Udupi (IN); Raju Suresh Dixit, Bangalore (IN); Sreevatsa Dwaraka Bhamidipati, Bangalore (IN); Srinivasa Rao Siddi, Krosur (IN); Kalyan Kakani, Hyderabad (IN); Vibhav Agarwal, Pilani (IN); Yashwant Saini, Chhipari (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/612,444

(22) Filed: Jun. 2, 2017

(65) Prior Publication Data
US 2017/0351342 A1 Dec. 7, 2017

(30) Foreign Application Priority Data
Jun. 2, 2016 (IN) .............................. 201641019244

(51) Int. Cl.
*G06F 40/274* (2020.01)
*G06F 40/35* (2020.01)
(Continued)

(52) U.S. Cl.
CPC ........ *G06F 3/0237* (2013.01); *G06F 3/04886* (2013.01); *G06F 40/274* (2020.01); *G06F 40/30* (2020.01)

(58) Field of Classification Search
CPC .... G06F 17/27; G06F 17/276; G06F 17/2785; G06F 17/3064; G06F 17/30643;
(Continued)

(56) References Cited

U.S. PATENT DOCUMENTS 5,577,165 A * 11/1996 Takebayashi ............. G06F 3/16
704/251
5,828,999 A 10/1998 Bellegarda et al.
(Continued)

FOREIGN PATENT DOCUMENTS

KR 10-2012-0005638 A 1/2012
WO 2015/165003 A1 11/2015

OTHER PUBLICATIONS

International Search Report, dated Sep. 12, 2017 by International Searching Authority in corresponding International Application No. PCT/KR2017/005812 (PCT/ISA/210).
(Continued)

*Primary Examiner* — Martin Lerner
(74) *Attorney, Agent, or Firm* — Sughrue Mion, PLLC

(57) ABSTRACT

An electronic device and a method for predicting a response are provided. The electronic device includes a display and a processor configured to receive at least one message, identify at least one contextual category of the at least one message, predict at least one response for the at least one message from a language model based on the at least one contextual category, and control the display to display the at least one predicted response.

10 Claims, 40 Drawing Sheets

(51) Int. Cl.
*G06F 3/023* (2006.01)
*G06F 40/30* (2020.01)
*G06F 3/0488* (2013.01)

(58) Field of Classification Search
CPC ........ G06F 40/279; G06F 40/30; G06F 40/35; G06F 3/0237; G06F 40/274; G06Q 10/107
USPC ....... 704/1, 9, 10; 706/12; 709/206; 715/256
See application file for complete search history.

(56) References Cited

U.S. PATENT DOCUMENTS

| | | | | |
|---|---|---|---|---|
| 7,590,603 | B2 * | 9/2009 | Zhang | G06F 16/353 704/10 |
| 8,990,126 | B1 * | 3/2015 | Bangalore | G06F 17/211 706/12 |
| 9,412,368 | B2 * | 8/2016 | Heo | G10L 15/30 |
| 9,886,958 | B2 * | 2/2018 | Celikyilmaz | G10L 17/04 |
| 10,120,864 | B2 * | 11/2018 | Sandor | G06F 40/35 |
| 2002/0023144 | A1 | 2/2002 | Linyard et al. | |
| 2005/0228790 | A1 | 10/2005 | Ronnewinkel et al. | |
| 2006/0020917 | A1 * | 1/2006 | Hying | G06F 9/451 717/115 |
| 2009/0106695 | A1 | 4/2009 | Perry et al. | |
| 2009/0327972 | A1 * | 12/2009 | McCann | G06Q 10/107 715/853 |
| 2010/0131274 | A1 * | 5/2010 | Stent | G10L 15/183 704/257 |
| 2012/0047134 | A1 * | 2/2012 | Hansson | G06F 17/3064 707/731 |
| 2013/0035932 | A1 * | 2/2013 | Bangalore | G06F 17/2785 704/9 |
| 2013/0151232 | A1 * | 6/2013 | Bangalore | G06F 17/279 704/2 |
| 2013/0151978 | A1 * | 6/2013 | Joo | G06F 40/274 715/738 |
| 2013/0212190 | A1 * | 8/2013 | Patil | G06F 40/274 709/206 |
| 2014/0280621 | A1 * | 9/2014 | Bourdaillet | G06Q 10/107 709/206 |
| 2015/0100537 | A1 * | 4/2015 | Grieves | G06F 40/274 706/52 |
| 2015/0256675 | A1 * | 9/2015 | Sri | H04M 3/5183 379/265.09 |
| 2015/0271128 | A1 * | 9/2015 | Mantey | G06Q 10/107 715/752 |
| 2015/0293602 | A1 | 10/2015 | Kay et al. | |
| 2015/0302301 | A1 * | 10/2015 | Petersen | G06N 5/04 706/11 |
| 2015/0317069 | A1 | 11/2015 | Clements et al. | |
| 2015/0347919 | A1 | 12/2015 | Bastide et al. | |
| 2015/0350118 | A1 * | 12/2015 | Yang | G06F 40/274 715/752 |
| 2015/0370780 | A1 | 12/2015 | Wang et al. | |
| 2015/0379984 | A1 * | 12/2015 | Stent | G10L 15/183 704/240 |
| 2016/0154782 | A1 * | 6/2016 | Romano | H04M 3/5175 704/9 |
| 2016/0162804 | A1 * | 6/2016 | Agarwal | G06Q 30/016 706/12 |
| 2016/0203566 | A1 * | 7/2016 | Kataria | G06Q 10/06398 709/206 |
| 2016/0210116 | A1 * | 7/2016 | Kim | G06F 17/276 |
| 2016/0217784 | A1 * | 7/2016 | Gelfenbeyn | G10L 15/32 |
| 2016/0224524 | A1 * | 8/2016 | Kay | G06F 40/274 |
| 2016/0320926 | A1 * | 11/2016 | Ganin | G06F 17/276 |
| 2016/0330597 | A1 * | 11/2016 | Kalkounis | G06F 17/276 |
| 2016/0352656 | A1 * | 12/2016 | Galley | G06F 17/2881 |
| 2017/0308290 | A1 * | 10/2017 | Patel | G06F 40/274 |
| 2017/0310616 | A1 * | 10/2017 | Cao | G06F 17/30643 |

OTHER PUBLICATIONS

Written Opinion, dated Sep. 12, 2017 by International Searching Authority in corresponding International Application No. PCT/KR2017/005812 (PCT/ISA/237).

"Introducing the world's first neural network keyboard", Oct. 8, 2015, 10 pages total, SwiftKey debuts alpha keyboard powered by Neural Networks, file:///C/Users/Administrator/Desktop/SwiftKey%20alpha%20keyboard%20powered%20by%20Neural%20Networks.htm.

Communication dated Dec. 12, 2018, issued by the European Patent Office in counterpart European Application No. 17807064.5.

* cited by examiner

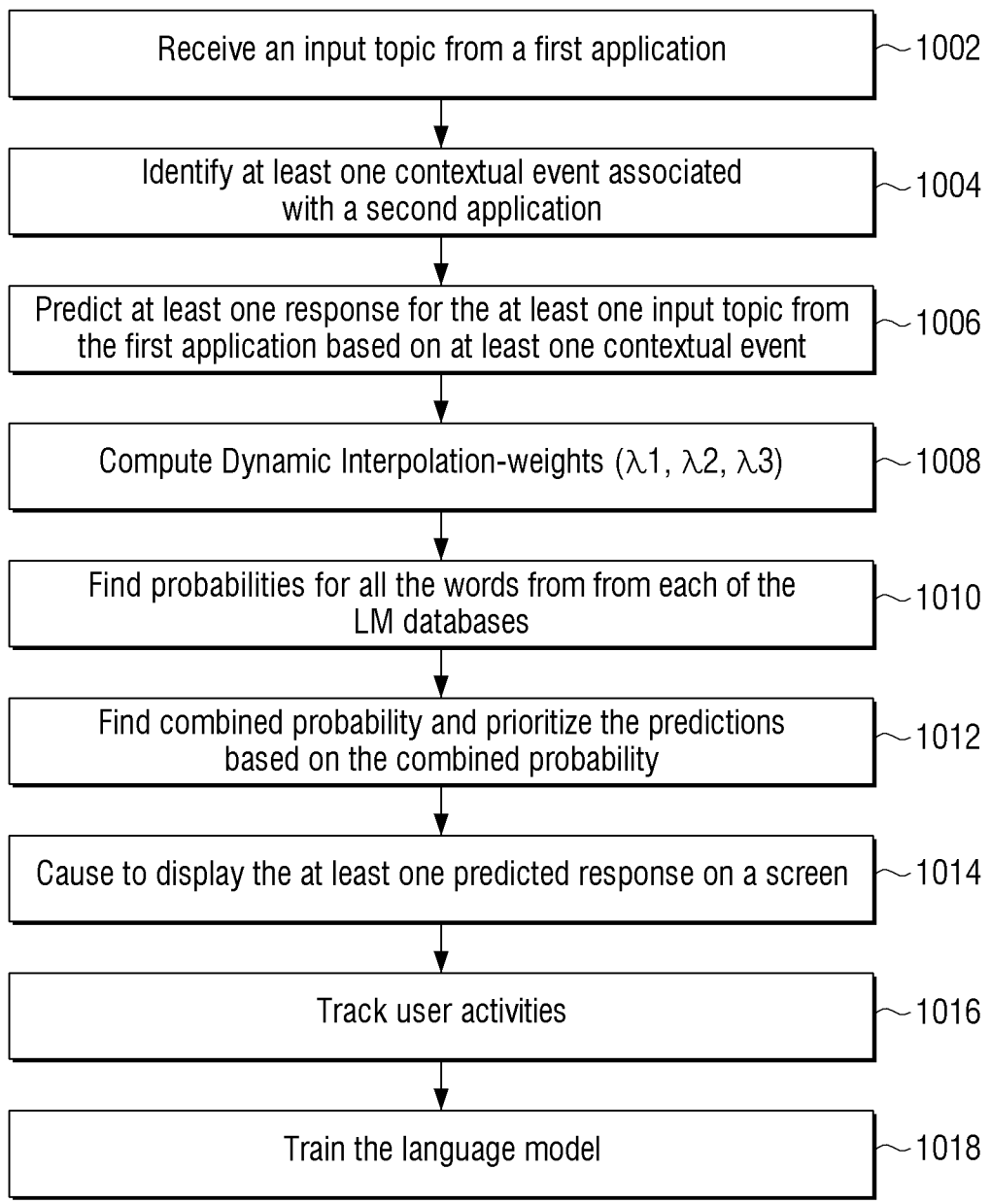

context: Location
(Based on Weather)

context: Location,
Time Users (Jenifer and Me)
location Time estimation

FIG. 21A

| DIALOG ACT TAGS | DOMAIN | SAMPLES | PREDICTION | | | SUGGESTIONS | | |
|---|---|---|---|---|---|---|---|---|
| WH | Distance module | How far is your house? | Near | Far | Around | 5 | | |
| | | | | | | Km | Miles | Minutes |
| | Time module | When do you go to work? | Morning | Evening | Late | At 9 | | |
| | | | | | | Am | Pm | O'clock |
| | Time-Duration module | How long was the play? | Long | Short | Lengthy | Around 6 | | |
| | | | | | | Hours | Minutes 5 | Days |
| | Time-tense module | When did you go to the movie? | Yesterday | Last week | Today | 5 hours | | |
| | | | | | | Ago | Back | Before |
| | | When will you finish the assignment? | Today | Tomorrow | Soon | In | | |
| | | | | | | An hour | A week | A day |
| | Quantity module | How much does it cost? | $ | A lot | Not much | I think around 50 | | |
| | | | | | | Rupees | Dollars | Bucks |
| | | How much does it weigh? | Around | A lot | Not much | 5 | | |
| | | | | | | Kg | Tons | Pounds |
| | Relation module (Noun entity recognition) | Who is Alan? | Alan is | He is | I don't know | He is my | | |
| | | | | | | Brother | Father | Boss |
| | Location module | Where are you? | Home | Office | At my | At | | |
| | | | | | | Home | Office | My |

FIG. 21B

| DIALOG ACT TAGS | DOMAIN | SAMPLES | PREDICTION | | | SUGGESTIONS | | |
|---|---|---|---|---|---|---|---|---|
| STATEMENT NON-OPINION | Sentiment Analysis + Point of View (1st person, 2nd person, 3rd person) | I am sick today | ☹ | That's bad | It's ok | Are | | |
| | | | | | | You fine | You okay | |
| | | You got selected for the job | ☺ | Thank you | Yayy! | | | |
| | | | | | | | | |
| | | We won the match today | ☺ | Great! | Good for you | That's | | |
| | | | | | | Awesome | Great | Brilliant |
| | Distance module | That's 100 km away from here | | | | That's | | |
| | | | | | | Near | Far | okay |
| | Time module | I reached home around 1 am in the night | | | | That's | | |
| | | | | | | Early! | Late! | Very |
| | Quantity module | It costs around 100 bucks | Wow | Oh! | | That's | | |
| | | | | | | Cheap | Costly | Expensive |

FIG. 21C

| DIALOG ACT TAGS | DOMAIN | SAMPLES | PREDICTION | | | SUGGESTIONS | | |
|---|---|---|---|---|---|---|---|---|
| STATEMENT OPINION | Neutral Opinion (Sentiment) | I think India will win today | Me too | May be | Okay | I | | |
| | | | | | | Agree | Don't think so | Think so |
| | Negative opinion (sentiment) + Point of View | I am sad | Why? | Don't worry | Its okay | You | | |
| | | | | | | Shouldn't be | Alright? | |
| | | You were annoying yesterday | :-| | Why? | Sorry! | I | | |
| | | | | | | Am sorry | Regret | Was? |
| | | Alan seems like a rude kid | He is | He isn't | Okay | I | | |
| | | | | | | Think so | Great | Brilliant |
| | Positive opinion (sentiment) + Point of View | I feel so good after yesterday | :) | Great! | Good for you | | | |
| | | You are a great guy | Thanks | Wow | :) | I am | | |
| | | | | | | Glad | Happy | Thankful |
| | | Da Vinci Code seems like a good book | Yes | Okay | I know | I | | |
| | | | | | | Think so | Agree | Disagree |
| APPRECIATION | Positive Sentiment Identification | You look nice today | You too | Thanks | :) | | | |

FIG. 21D

| DIALOG ACT TAGS | DOMAIN | SAMPLES | PREDICTION | | | SUGGESTIONS | | |
|---|---|---|---|---|---|---|---|---|
| ORDER DIRECTIVES | Location module | Tell me where the party is at | It is at | Don't worry | Wait a sec | I | | |
| | | | | | | Will tell | Won't tell | Was? |
| | Quantity module (Money transaction) | Make the payment | How much? | Cash or card | Will do | I | | |
| | | | | | | Will do | Won't do | |
| | Object/ Person module | Give that to me | What | When | I can't | I | | |
| | | | | | | Will | Won't | |
| CONVENTIONAL CLOSING | Time module (Time period identification) | See you later | Good night | See you | Bye | | | |
| CONVENTIONAL CLOSING | Time module (Time period identification) | Heyy Man, wassup? | Good Afternoon | How are you? | Heyy | | | |
| YES-OR-NO QUESTION | Location module | Did you reach the office? | Yes | No | Not yet | | | |
| | Distance module | Is it far from here? | Yes | No | Not so far | | | |
| | Parser information | Is he home yet? | He is home | Yes | No | | | |

METHOD AND ELECTRONIC DEVICE FOR PREDICTING A RESPONSE FROM CONTEXT WITH A LANGUAGE MODEL

CROSS-REFERENCE TO RELATED APPLICATION(S)

This application claims the benefit under 35 U.S.C. § 119(a) of Indian Provisional Patent Application No. 201641019244 filed on Jun. 2, 2016 in the Indian Intellectual Property Office, and Indian Patent Application No. 201641019244 filed on Jun. 1, 2017 in the Indian Intellectual Property Office, the entire disclosure of each of which is hereby incorporated by reference.

TECHNICAL FIELD

The present disclosure relates to electronic devices. More particularly, the present disclosure relates to a method and an electronic device for predicting response.

BACKGROUND

In general, a word prediction technique involves an n-gram language model. The goal of the n-gram language model is to compute probability of a sentence or sequence of words and use it to compute the probability of a suggesting word (i.e., upcoming word). Typically bigram or trigram models are used considering the speed and size of language models. The trigram model includes unigram, bigram and trigram features. The unigram feature is based on the current word being typed, the feature bigram is based on the current word being typed and the previous word that is typed, and the trigram feature is based on the current word being typed and the previous two words that are typed. However, these models have long-distance dependencies. Hence, it is difficult to track longer sentences and predictions may not be accurate.

If the n-gram language model is extended to 7-grams (for example), it may be able to the track previous 7 words and the longer sentence. This can lead to exponential growth of the number of parameters with length of the n-gram language model and hence the increase in complexity in training the language model, increase in training time of the language model, and performance of expensive storage and retrieval operations in existing systems. Hence, it is not recommended to increase the size of the n-gram language model in the existing systems. Further, these models are based on the current sentence being typed. The intention behind typing the sentence is ignored.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and electronic device for predicting a response.

Another object of the embodiments herein is to provide a method for receiving at least one message, and identifying at least one contextual category of the at least one message.

Another object of the embodiments herein is to provide a method for predicting at least one response for the at least one message from a language model (e.g., local language model) based on the at least one contextual category.

Another object of the embodiments herein is to provide a method for causing to display the at least one predicted response on a screen of the electronic device.

Yet another object of the embodiments herein is to provide a method for receiving an input topic from a first application and identifying at least one contextual event associated with a second application.

Yet another object of the embodiments herein is to provide a method for predicting at least one response for the at least one input topic from the first application based on at least one contextual event.

Yet another object of the embodiments herein is to provide a method for causing to display the at least one predicted response on a screen of the electronic device.

Yet another object of the embodiments herein is to provide a method for receiving an input topic and identifying at least one contextual category of the input topic.

Yet another object of the embodiments herein is to provide a method for predicting at least one response for the input topic from a language model based on the at least one contextual category, and causing to display the at least one predicted response on a screen of the electronic device.

In accordance with an aspect of the present disclosure, a method for predicting response at an electronic device is provided. In accordance with another aspect of the present disclosure, a controlling method of an electronic apparatus is provided. The method includes receiving at least one message at the electronic device. Further, the method includes identifying at least one contextual category of the at least one message. Further, the method includes predicting at least one response for the at least one message from a language model based on the at least one contextual category. Furthermore, the method includes causing to display the at least one predicted response on a screen of the electronic device.

In an embodiment, the contextual category of the at least one message is automatically identified based on at least one context indicative.

In an embodiment, the at least one context indicative is dynamically determined based on at least one of content available in the at least one message, user activities, events defined in the electronic device, a user associated with the at least one message, a user context, and a context of the electronic device.

In an embodiment, the at least one message is displayed within a notification area of the electronic device.

In an embodiment, the at least one predicted response is displayed within the notification area of the electronic device.

In an embodiment, the at least one response for the at least one message is predicted in response to an input on the at least one received message, wherein the at least one predicted response corresponds to the at least one received message on which the input is received.

Accordingly embodiments herein provide a method for predicting a response at an electronic device. The method includes receiving an input topic from a first application. Further, the method includes identifying at least one contextual event associated with a second application. Further, the method includes predicting at least one response for the at least one input topic from the first application based on at least one contextual event. Furthermore, the method includes causing to display the at least one predicted response on a screen of the electronic device.

In an embodiment, the at least one contextual event is a time bound event.

In an embodiment, the at least one contextual event associated with the second application is dynamically determined based on at least one context indicative associated with the input topic of the first application.

In an embodiment, the at least one context indicative is determined based on at least one of content available in the input topic, context of the first application, user activities, and events defined in the electronic device.

Accordingly embodiments herein provide a method for predicting a response at an electronic device. The method includes receiving an input topic. Further, the method includes identifying at least one contextual category of the input topic. Further, the method includes predicting at least one response for the input topic from a language model based on the at least one contextual category. Furthermore, the method includes causing to display the at least one predicted response on a screen of the electronic device.

In an embodiment, the input topic is one of a topic selected from a written communication, and a topic formed based at least one input field available in an application.

In an embodiment, the at least one contextual category of the input topic is automatically identified based on at least one context indicative.

In an embodiment, the at least one context indicative is dynamically determined based on at least one of content available associated with the input topic, user activities, events defined in the electronic device, and a user context and a context of the electronic device.

Accordingly embodiments herein provide an electronic device for predicting a response. The electronic device includes a context identifier configured to receive at least one message. Further, the electronic device includes a contextual category detector configured to identify at least one contextual category of the at least one message. Furthermore, the electronic device includes a response predictor configured to: predict at least one response for the at least one message from a language model based on the at least one contextual category, and cause to display the at least one predicted response on a screen.

Accordingly embodiments herein provide an electronic device for predicting a response. The electronic device includes a context identifier configured to receive an input topic from a first application. Further, the electronic device includes a contextual category detector configured to identify at least one contextual event associated with a second application. Furthermore, the electronic device includes a response predictor configured to: predict at least one response for the at least one input topic from the first application based on at least one contextual event, and cause to display the at least one predicted response on a screen of the electronic device.

Accordingly embodiments herein provide an electronic device for predicting a response. The electronic device includes a context identifier configured to receive an input topic. Further, the electronic device includes a contextual category detector configured to identify at least one contextual category of the input topic. Furthermore, the electronic device includes a response predictor configured to: predict at least one response for the input topic from a language model based on the at least one contextual category, and cause to display the at least one predicted response on a screen.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 10 is a flow diagram illustrating a method for predicting the response based on the statistical modelling manager, according embodiments as disclosed herein;

FIGS. 21A to 21D illustrates various table tabulating the response predictions and next suggestive words for different samples of inputs, according to an embodiment of the present disclosure.

Throughout the drawings, it should be noted that like reference numbers are used to depict the same or similar elements, features, and structures.

DETAILED DESCRIPTION

Figure 1A:
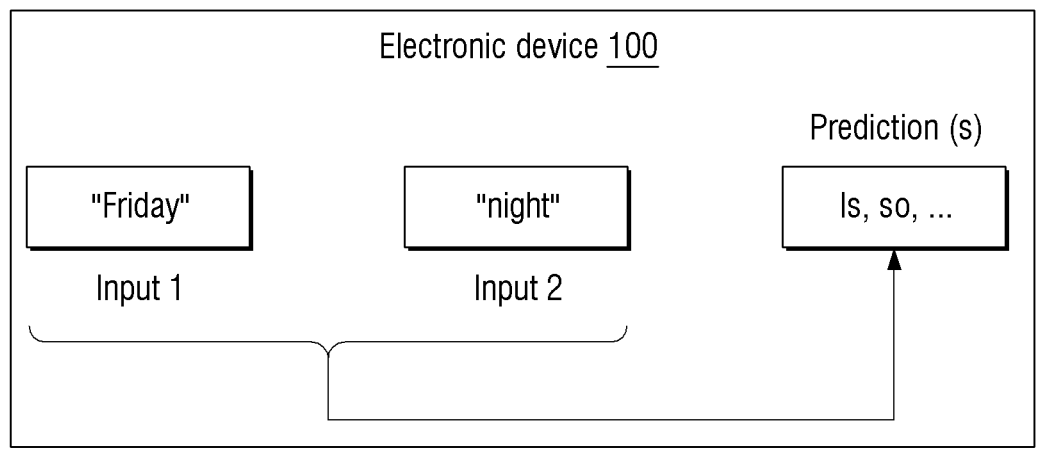
FIGS. 1A to 1D illustrate various types of N-Gram language models according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Various embodiments of the present disclosure described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which the various embodiments herein can be practiced and to further enable those skilled in the art to practice the various embodiments herein. Accordingly, the examples should not be construed as limiting the scope of the various embodiments herein.

As is traditional in the field, various embodiments may be described and illustrated in terms of blocks which carry out a described function or functions. These blocks, which may be referred to herein as units or modules or the like, are physically implemented by analog and/or digital circuits, such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports, such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the various embodiments may be physically separated into two or more interacting and discrete blocks without departing from the scope of the disclosure. Likewise, the blocks of the various embodiments may be physically combined into more complex blocks without departing from the scope of the disclosure.

Accordingly embodiments herein provide a method for predicting response at an electronic device. The method includes receiving at least one message at the electronic device. Further, the method includes identifying at least one contextual category of the at least one message. Further, the method includes predicting at least one response for the at least one message from a language model based on the at least one contextual category. Furthermore, the method includes causing to display the at least one predicted response on a screen of the electronic device.

In the related art, the predictions of word(s), graphical element, or the like are determined and updated only during typing. For example, consider a scenario in which a user of the electronic device receives a message from a "X" source. Once, the electronic device detects an input in the event of responding to the message, a keyboard may automatically launch aiding the user in composing the response to the message. Further, as the user starts composing the response for the message, the existing systems may determine the text/word during typing and predict the related text/words, graphical element, or the like. Thus, the predicted words are determined and updated only during typing. Unlike the conventional methods and systems, the proposed method can be used to provide the prediction of words even before the user starts composing the response to the message.

Generally, only default word(s)/text/graphical element, or the like are provided to the user of the electronic device prior to composing the response to the received message. Yet, again the default words are not meaningful (or, unrelated) to the context of the conversation/to the received message. According to various embodiments of the present disclosure, the proposed method can be used to predict the words which are relevant to the context of the conversation/to the received message. The present method improves the user experience by providing the relevant and related graphical elements while composing.

Accordingly, the proposed method of the present disclosure can be used to provide predictions for longer sentences or providing predictions for the sentences being typed. The proposed method can be used to perform the word prediction based on the contextual input class.

In an embodiment of the present disclosure, when the user has to respond multiple messages, upon selecting a thread, relevant predictions shall be provided. In other aspect, message or thread selection can be done automatically by using.

FIGS. 1A to 1D illustrate various types of N-Gram language models, according to the related art.

Referring to the FIG. 1A, the N-Gram language model is driven from equation-1 (shown below). The N-Gram language model includes a general n-gram language model that predicts/suggests current word based on the previous set of words. Thus, the N-Gram language model can determine the set of words associated with input-1 and input-2, and provides the prediction/suggestions based on the determined set of words associated with the input-1 and the input-2.

$$P(w_1, \ldots, w_m) = \prod_{i=1}^{m} P(w_i | w_1, \ldots, w_{i-1}) \approx \prod_{i=1}^{m} P(w_i | w_{i-(n-1)}, \ldots, w_{i-1}) \quad (1)$$

For example, if the electronic device 100 detects the input-1 as "Friday" and the further detects the input-2 as "night", then the predicted/suggested words can include, for example, "is", "are", "so", or the like, which are not meaningful.

Figure 1B:
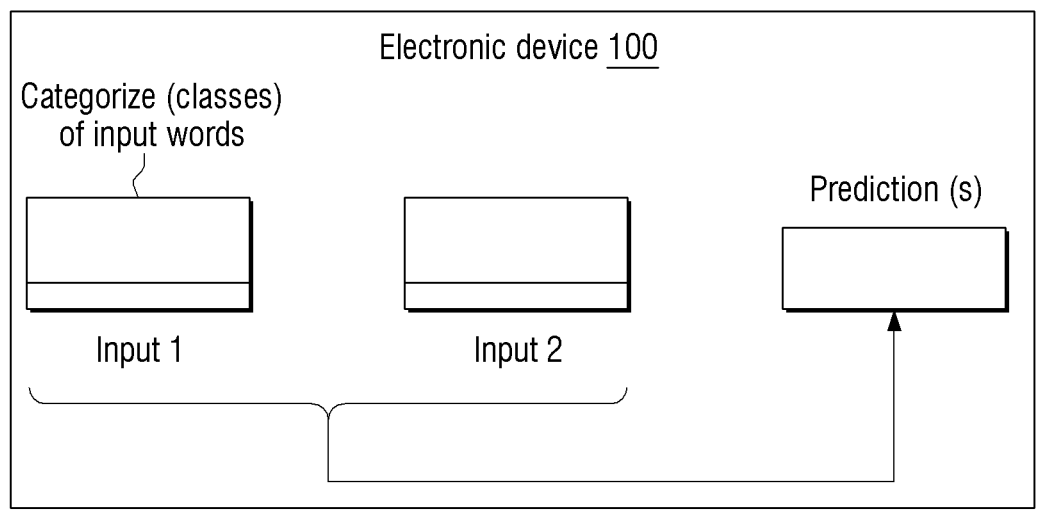

Referring to FIG. 1B, the N-Gram language model for a class is driven from equation-2 (shown below). The N-Gram Model includes predicting/suggesting the current word based on previous set of words and their respective classes.

$$p(w_i | w_{i-k}w_{i-k+1} \ldots w_{i-1}) \overset{def}{=} p(c_i | c_{i-k+1} \ldots c_{i-1}) p(w_i | c_i), \quad (2)$$

Figure 1C:
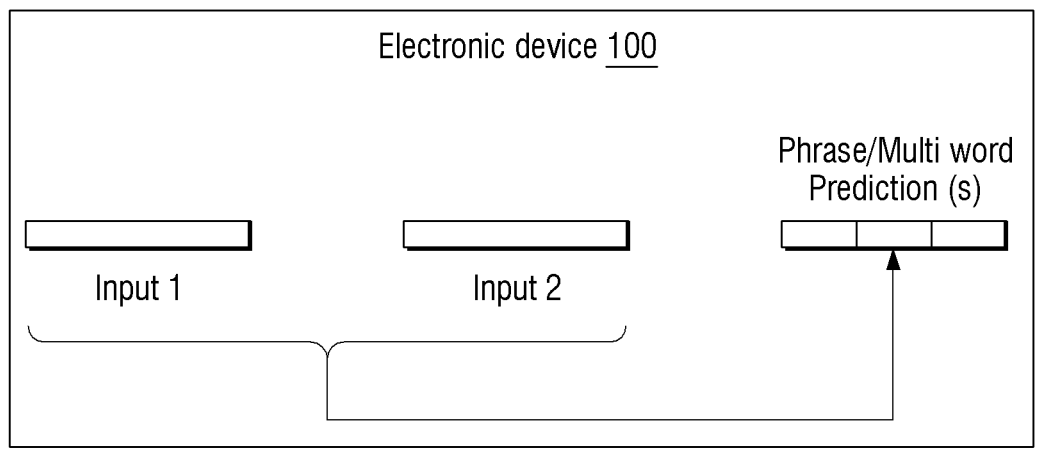

Referring to FIG. 1C, the N-Gram language model for a phrase is driven from equation-3 (shown below). The N-Gram language model includes predicting one or more words (phrase) based on the previous set of words.

$$p(w) \overset{def}{=} p(\gamma). \quad (3)$$
$$p(\gamma) = p(\gamma_1 \gamma_2 \ldots \gamma'_m)$$
$$= \prod_{i=1}^{m'} p(\gamma_i | \gamma_1 \ldots \gamma_{i-1}),$$
$$p(\gamma_i | \gamma_1 \ldots \gamma_{i-1}) \approx p(\gamma_i | \gamma_{i-k} \gamma_{i-k+1} \ldots \gamma_{i-1}),$$

Figure 1D:
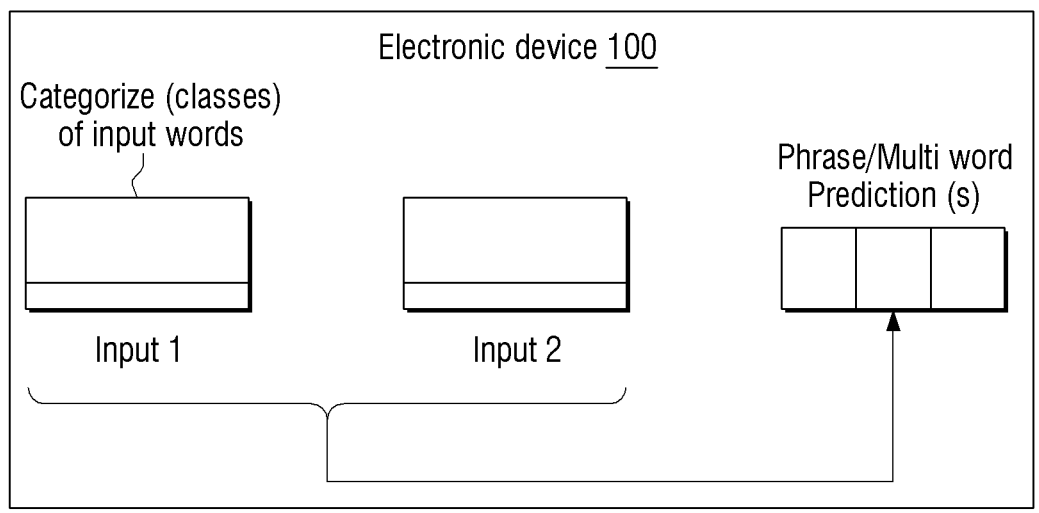

Referring to FIG. 1D, the N-Gram language model for a phrase class is driven from equation-4 (shown below). The N-Gram language model includes predicting one or more words (phrase) based on the previous set of words and their respective classes.

$$p(w) \overset{def}{=} p(\gamma) \quad (4)$$
$$= p(\gamma_1 \gamma_2 \ldots \gamma'_m)$$
$$= \prod_{i=1}^{m'} p(\gamma_i | \gamma_1 \gamma_2 \ldots \gamma_{i-1}),$$
$$p(\gamma_i | \gamma_1 \gamma_2 \ldots \gamma_{i-1}) \approx p(\gamma_i | \gamma_{i-k} \gamma_{i-k+1} \ldots \gamma_{i-1}),$$
$$p(\gamma_i | \gamma_{i-k} \gamma_{i-k+1} \ldots \gamma_{i-1}) \overset{def}{=} p(c_i | c_{i-k} c_{i-k+1} \ldots c_{i-1}) p(\gamma_i | c_i),$$

Figure 2:
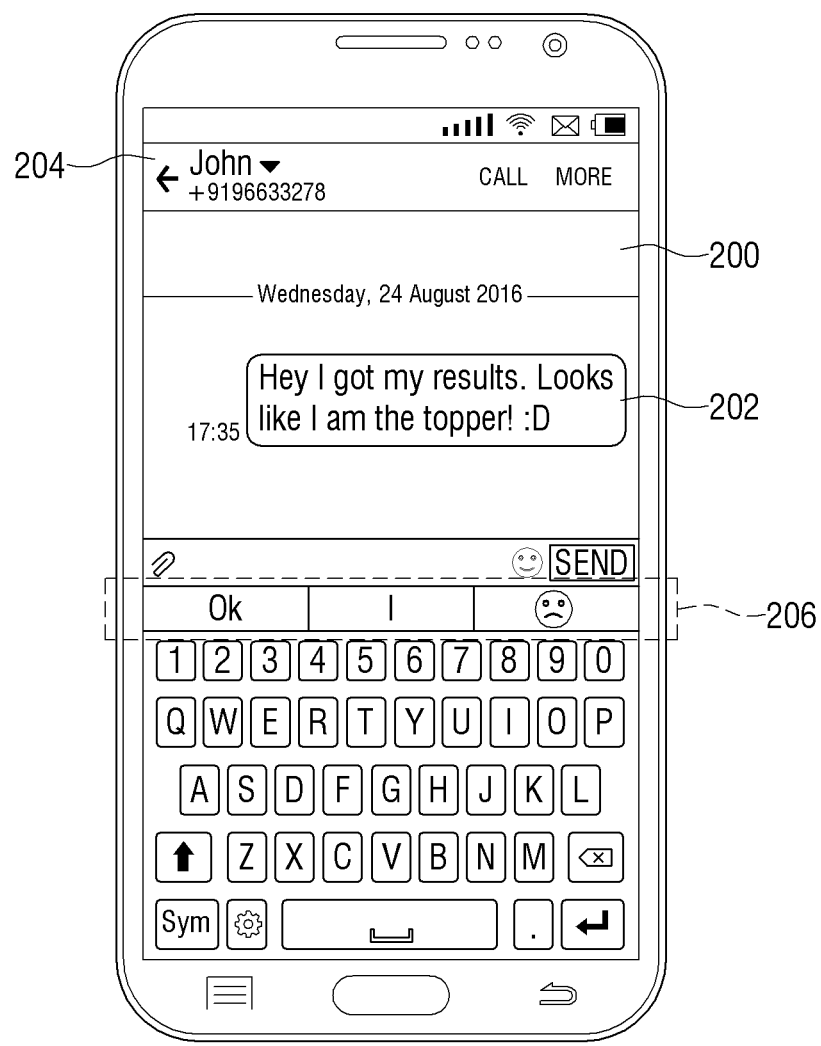
FIG. 2 illustrate a User Interface (UI) for responding to the message using at least one predicted response, according to the related art.

FIG. 2 illustrate a User Interface (UI) for responding to the message using at least one predicted response, according to the related art.

Referring to FIG. 2, the electronic device 100 may have a message transcript 200 showing a conversation between the user of the electronic device 100 and one or more participants, such as participant 204. The message transcript 200 may include a message 202 received from (an electronic device used by) the participant 204.

The content of the message 202 "Hey I got my results. Looks like I am the topper!:D" is conveying the happiness from the participant 204 to the user of the electronic device 100. If the user of the electronic device 100 may intend to respond to the message 202, according to the existing mechanisms, only default graphical element 206 i.e., "Ok", "I", or the like., are predicted and displayed on the screen of the electronic device 100. Alternately, the default graphical element 206 may be prone to change (i.e., update) as the user starts typing (i.e., responding) to the message 202.

Further, in regards to the user typing i.e., if the n-gram (or, neural net (NN)) is extended to 7-grams (for example), it may be able to track previous 7 words and the longer sentence. This can lead to exponential growth of the number of parameters with length of the n-gram language model (or, NN language model) and hence the increase in complexity in training the language model (N/n gram, NN gram), increase in training time of the language model, and performance expensive storage and retrieval operations in the existing systems.

Figure 3A:
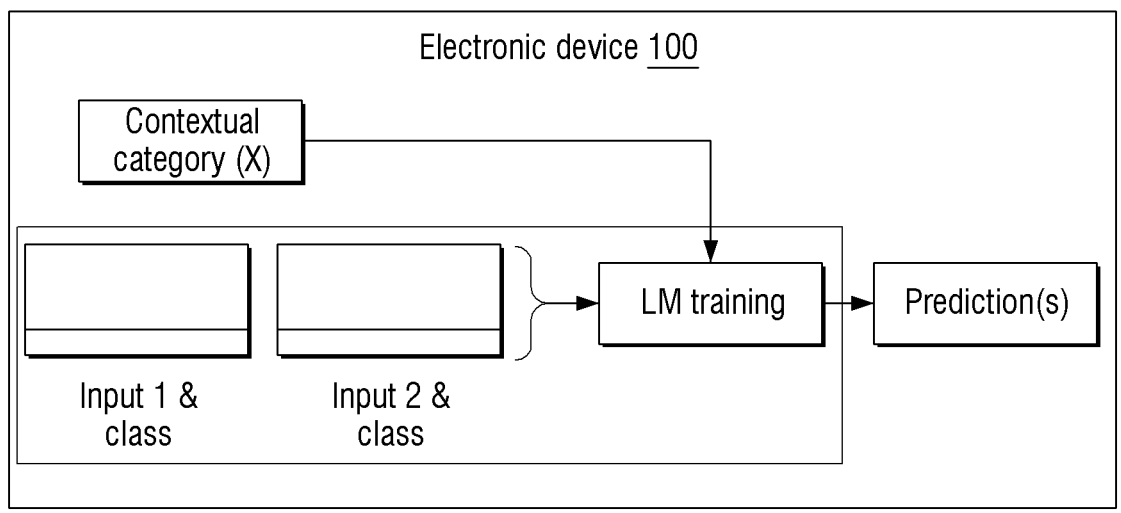
FIG. 3A illustrates a schematic view of (N+X) gram language model/(NN+X) language model, according to an embodiment of the present disclosure.

FIG. 3A illustrates a schematic view of a (N+X) gram language model/(NN+X) language model, according to an embodiment of the present disclosure.

In an embodiment of the present disclosure, the electronic device 100 can utilize the contextual category of the input(s) i.e., input-1 and input-2, along with the bigram or trigram features of the input(s), this can be derived using equations (5) and (6).

$$p(w) \overset{def}{=} p(\gamma) \quad (5)$$
$$= p(\gamma_1 \gamma_2 \ldots \gamma'_m)$$
$$= \prod_{i=1}^{m'} p(\gamma_i | \gamma_1 \gamma_2 \ldots \gamma_{i-1}),$$
$$p(\gamma_i | \gamma_1 \gamma_2 \ldots \gamma_{i-1}) \approx p(\gamma_i | \gamma_{i-k} \gamma_{i-k+1} \ldots \gamma_{i-1}).$$

$$p(\gamma_i | \gamma_{i-k} \gamma_{i-k+1} \ldots \gamma_{i-1}) \overset{def}{=}$$
$$p(c_i | c_{i-k} c_{i-k+1} \ldots c_{i-1}, c_{Input1}, c_{Input2}, \ldots, c_{InputN}) p(\gamma_i | c_i) \quad (6)$$

For example, contextual category of the input(s) can be identified by parsing the screen i.e., parts of speech associated with the contents available on the screen, sentence classification, dependency parser, or the like.

Figure 3B:
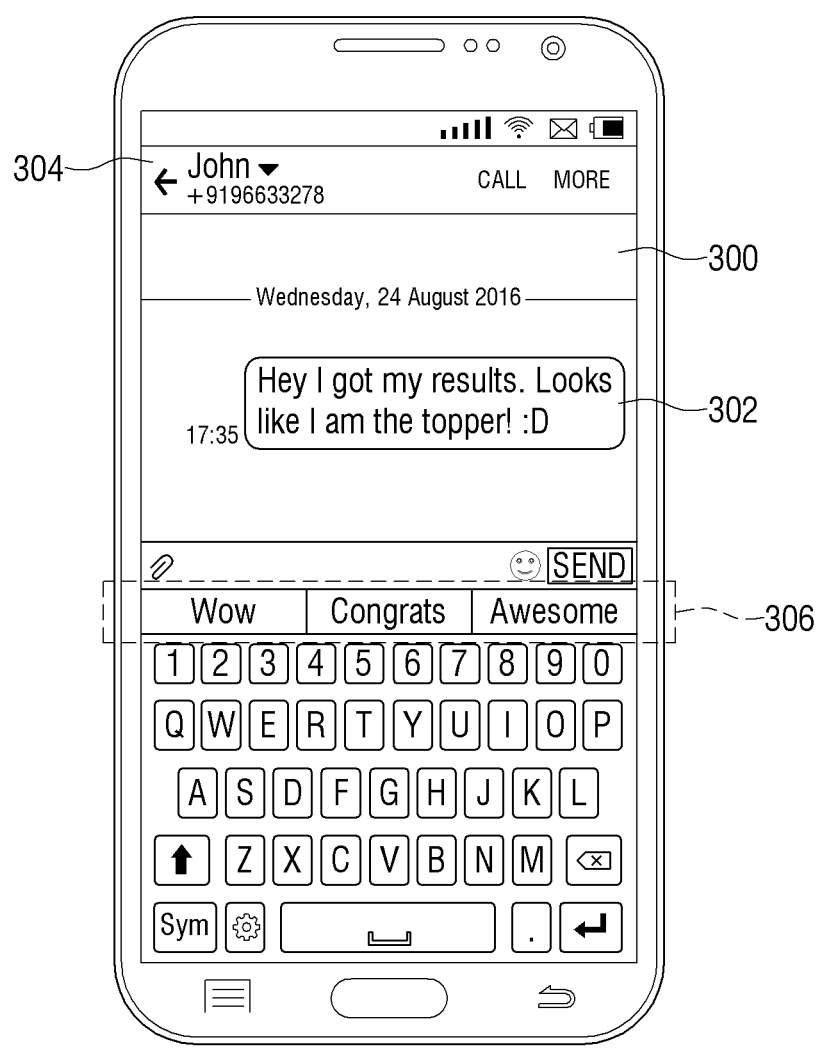
FIG. 3B illustrate the UI for responding to the message using at least one predicted response, according to an embodiment of the present disclosure.

FIG. 3B illustrates the UI for responding to the message using at least one predicted response, according to an embodiment of the present disclosure.

In an embodiment of the present disclosure, the electronic device 100 can provide the meaningful predictions before the user of the electronic device 100 starts responding (i.e., typing) to the message. The meaningful predictions are based on the context indicative of the received message. Further, the proposed method can be used to provide at least one predicted response from a language model based on the at least one contextual category of the message. Thus, the language model (e.g., "N" gram language model/NN language model) utilizes the contextual category ("X") of the message (e.g., (N+X)/(NN+X)) as illustrated in FIG. 3A. Thus, using the contextual category of the message reduces the complexity in training the language model, reduces the training time of the language model, and improves the performance of expensive storage and retrieval operations.

Referring to FIG. 3B, the electronic device 100 may have a message transcript 300 showing a conversation between the user of the electronic device 100 and one or more participants, such as participant 304. The message transcript 300 may include a message 302, received from (an electronic device used by) the participant 304.

The content of the message 302 "Hey I got my results. Looks like I am the topper!:D" is conveying the happiness from the participant 304 to the user of the electronic device 100. Unlike to conventional methods and systems, the proposed method can be used to determine at least one contextual category of the message 302 i.e., the contextual category of the received message 302 can be for example, "Appreciation". Further, the proposed method can be used to predict at least one response 306 i.e., "Wow", "congrats", "Awesome", or the like from the language model based on the at least one contextual category.

In an embodiment of the present disclosure, the proposed method can be used to predict and display the at least one response, even before the user starts composing the response message. This improves the user experience by displaying the meaningful predictions to the message 302.

Figure 4:
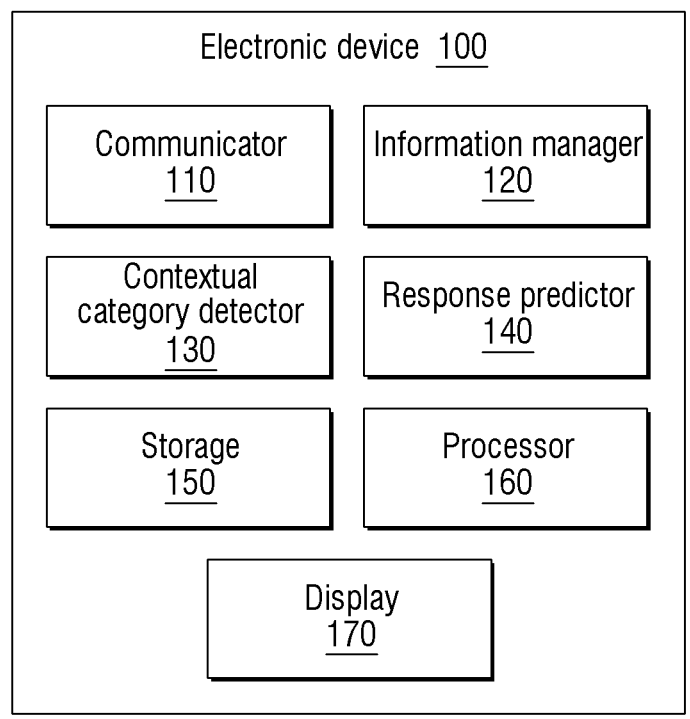
FIG. 4 is a block diagram illustrating various hardware elements of an electronic device, according to an embodiment of the present disclosure.

FIG. 4 is a block diagram illustrating various hardware elements of the electronic device, according to an embodiment of the present disclosure.

Referring to FIG. 4, the electronic device 100 can include, for example, a mobile phone, a smart phone, Personal Digital Assistants (PDAs), a tablet, a wearable device, a computer, a laptop, etc. In an embodiment of the present disclosure, the electronic device 100 can include a display and a touch-sensitive surface.

The electronic device 100 may support a variety of applications, such as, a messaging applications, a calendar application, a browser application, a word processing application, a telephone application, an e-mail application, an instant messaging application, a Short Message Service (SMS) message, a Multimedia Message Service (MMS) message, or the like. Further, the variety of applications may optionally require at least one of keypad, keyboard, touch sensitive surface, or the like, for interacting with at least one feature of the at least one application. For example, add reminder is a feature of a calendar application, message composing is a feature of the messaging application, or the like.

The electronic device 100 may include a communicator 110, an information manager 120, a contextual category detector 130, and a response predictor 140. Further, the electronic device 100 may include a processor 160, (for example; a hardware unit, an apparatus, a Central Processing Unit (CPU), a Graphics Processing Unit (GPU), etc.,) communicatively coupled to a storage (memory) 150 (e.g., a volatile memory and/or a non-volatile memory). The storage 150 may include storage locations configured to be addressable through the processor 160. The information manager 120, the contextual category detector 130, and the response predictor 140 may be coupled with the processor 160. The information manager 120, the contextual category detector 130, and the response predictor 140 may be implemented by the processor 160.

The storage 150 can be can be coupled (or, communicatively coupled) with the processor 160, the communicator 110, the information manager 120, the contextual category detector 130, and the response predictor 140. In another embodiment, the storage 150 can be remotely located to that of the processor 160, the communicator 110, the information manager 120, the contextual category detector 130, and the response predictor 140.

Furthermore, the electronic device 100 includes a display 170 capable of being utilized to display on the screen of the electronic device 100. In an embodiment of the present disclosure, the display 170 can be, for example, a Cathode Ray Tube (CRT), a Liquid Crystal Display (LCD), Organic Light-Emitting Diode (OLED), a Light-emitting diode (LED), Electroluminescent Displays (ELDs), field emission display (FED), LPD (light emitting polymer display), etc. The display 170 can be configured to display the one or more UI of the variety of applications. The display 170 can be coupled (or, communicatively coupled) with the processor 160 and the storage 150. Further, the display 170 can be coupled (or, communicatively coupled) with the information manager 120, the contextual category detector 130, and the response predictor 140.

The communicator 110 facilitates communication with other devices over one or more external ports (e.g., Universal Serial Bus (USB), FIREWIRE, etc.). The external port is adapted for coupling directly to other electronic devices or indirectly over a network (e.g., the Internet, wireless LAN, etc.). Further, the communicator 110 facilitates communication with the internal hardware elements of the electronic device 100.

The information manager 120, coupled with the communicator 110, can be configured to receive at least one message. The at least one message can be at least one SMS message, SNS message, and the like that are associated with at least one application from the aforementioned variety of applications. The at least one message can include at least one content.

Further, the electronic device 100 can include a text input module (not shown) which may be a GUI component displayed on the screen of the display 170. The GUI component can be, for example, virtual keypad, virtual keyboard, soft keyboards, and the like for entering the text in the variety of applications.

In an embodiment of the present disclosure, the electronic device 100 can include a Global positioning system (GPS) module (not shown) for determining the location of the electronic device 100 and provide this information to the variety of applications running in the electronic device 100. Further, the electronic device 100 can include one or more sensors e.g., accelerometer sensor, proximity sensor, temperature sensor, or the like. The electronic device 100 can be configured to determine the context (e.g. weather related information, traffic related information, and the like) of the electronic device 100 using the one or more sensors in combination with the GPS module.

Further, the contextual category detector 130 can be configured to identify the at least one contextual category of the at least one message. In an embodiment of the present disclosure, the at least one contextual category of the at least one message is automatically identified based on at least one context indicative.

In an embodiment of the present disclosure, the at least one context indicative is dynamically determined based on the content available in the at least one message, user activities (e.g., user tracker information), events (e.g., time event, location event, relation event, and the like) defined in the electronic device 100, sensing data (e.g., temperature, humidity, location, and the like) sensed by sensors of the electronic device 100, received data from a server (e.g., weather, news, advertisement, and the like), a user (e.g., the participant) associated with the at least one message, a user context (e.g., appointment, health, user tone or the like), the context of the electronic device 100, or the like.

The response predictor 140 can be configured to predict the at least one response for the at least one message from the language model based on the at least one contextual category. In an embodiment of the present disclosure, the language model can be, for example, N gram language model. Based on the predicted response, the response predictor 140 can be configured to display the at least one predicted response on the screen of the display 170.

In another embodiment, the information manager 130 can be configured to receive the input topic from a first application. The input topic can be, for example, written text, at least one received message, or the like. The first application can be any one of the application from the aforementioned variety of the applications.

Further, the contextual category detector 140 can be configured to identify at least one contextual event associated with a second application. In an embodiment of the present disclosure, the contextual event can include, for example, the time event, the location event, the relation event, or the like. The second application can be any of the application from the aforementioned variety of the applications. In an embodiment of the present disclosure, the contextual event associated with the second application is dynamically determined based on at least one context indicative associated with the input topic of the first application.

In an embodiment of the present disclosure, the at least one context indicative is determined based on, for example, content available in the input topic, a context (weather application, calendar application, shopping application, etc.,) of the first application, the user activities, and the events defined in the electronic device 100.

In yet another embodiment, the information manager 120 can be configured to receive the input topic. The input topic can include, for example, topic selected from a written communication, topic formed based at least one input field available in the application, current editor, user selected content, text on screen of the electronic device 100, and the like.

Further, the contextual category detector 130 can be configured to identify at least one contextual category of the input topic. In an embodiment of the present disclosure, the at least one contextual category of the input topic is automatically identified based on at least one context indicative. In an embodiment of the present disclosure, the at least one context indicative is dynamically determined based on at least one of content available in the input topic, the user activities, the events defined in the electronic device 100, the user context, and a context of the electronic device 100.

In other aspect, conversation can be sent to server when the electronic device 100 is idle. The operations of the contextual category detector 130 and the response predictor 140 can be done in server (remotely located). Further, the LM training is performed when the prediction response is shared with the electronic device 100.

In an embodiment of the present disclosure, the electronic device 100 may be in communication with a remote computing device (not shown) via one or more communication networks. A communication network may be a local area network (LAN), a wide area network (WAN), a mobile or cellular communication network, an extranet, an intranet, the Internet and/or the like. In an embodiment of the present disclosure, the communication network may provide communication capability between the remote computing device and the electronic device 100.

In an embodiment of the present disclosure, the remote computing device may be a cloud computing device or a networked server located remotely from the electronic device 100. The remote computing device may include similar or substantially similar hardware elements to that of the electronic device 100.

The FIG. 4 shows exemplary hardware elements of the electronic device but it is to be understood that other embodiments are not limited thereon. In other embodiments, the electronic device 100 may include less or more number of hardware elements. Further, the labels or names of the hardware elements are used only for illustrative purpose and does not limit the scope of the invention. One or more hardware elements can be combined together to perform same or substantially similar function in the electronic device 100.

Figure 5:
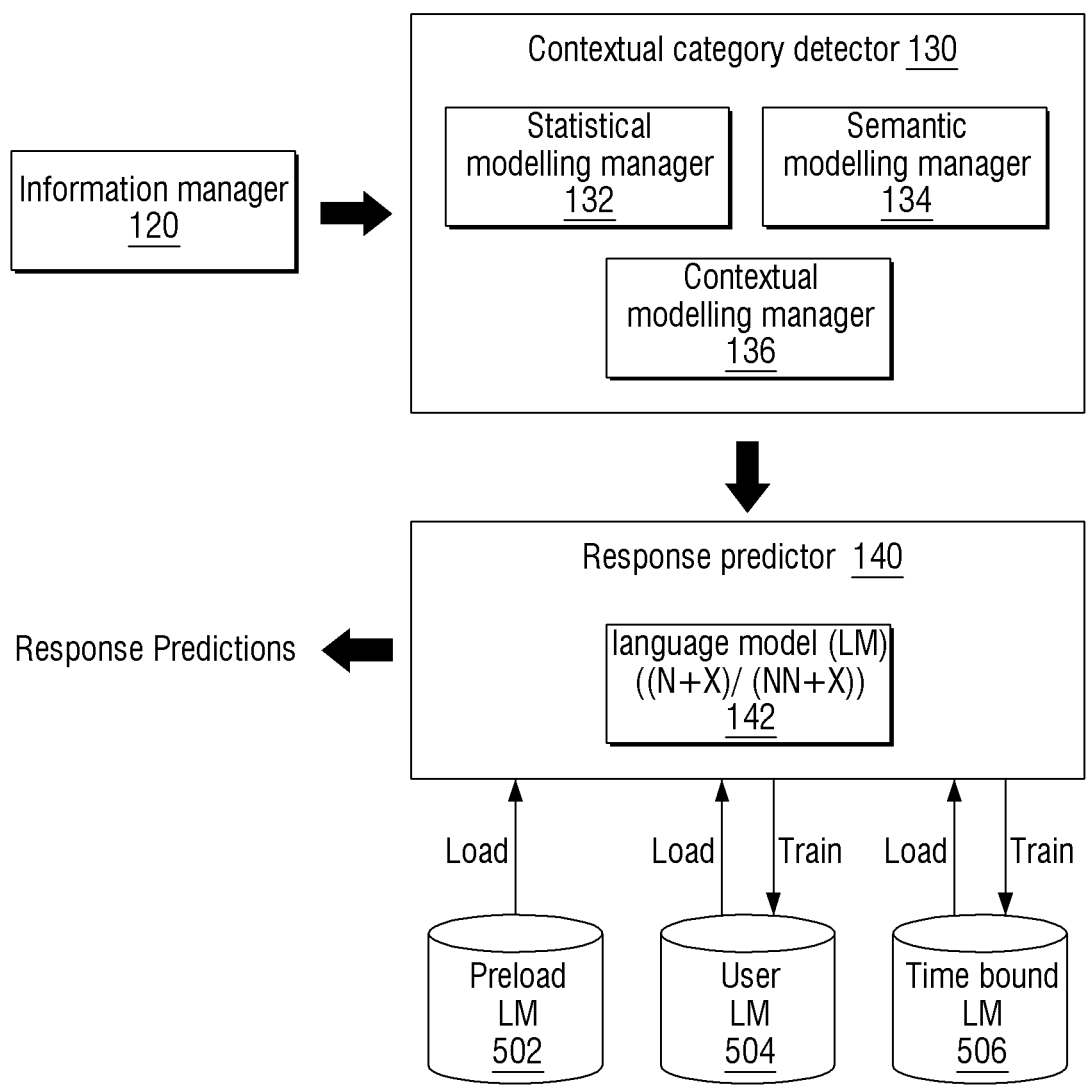
FIG. 5 is an overview illustrating communication among various hardware elements of the electronic device for automatically predicting the response, according to an embodiment of the present disclosure.

FIG. 5 is an overview illustrating communication among various hardware elements of the electronic device for automatically predicting the response, according to an embodiment of the present disclosure.

Referring to FIG. 5, the information manager 120 can be configured to receive the at least one input for example, the at least one message, the written communication, the topic selected from the written communication, the topic formed based at least one input field available in the application, the topic formed based at least one input field available in the applications, received mail, complete conversation/chat, or the like. The information manager 120 can be configured to communicate the received input with the contextual category detector 130.

In an embodiment of the present disclosure, the contextual category detector 130 can include a statistical modelling manager 132, a semantic modelling manager 134, and a contextual modelling manager 136.

The statistical modelling manager 132 can be configured to identify one or more statistical features associated with the received input. For example, the one or more statistical features can include time bound, location, etc.

The semantic modeling manager 134 can be configured to identify one or more words associated with the received input. Further, the semantic modelling manager 134 can be configured to identify one or more categories of the received input. The one or more categories can be identified by selecting one or more features associated with the received input. For example, the one or more features may include the context of the electronic device 100 and user of the electronic device 100, a domain identification, a Dialog Act (DA) identification, a subject identification, a topic identification, a sentiment analysis, a point of view (PoV), a user tracker information, and the like.

For example, the domain identification can include a time, a distance, a time-duration, a time-tense, a quantity, a relation, a location, and an object/person, and the like. For example, the DA identification can include statement non-opinion, an acknowledgement, apology, agree/accept, appreciation, Yes-No-question, Yes-No-answers, conventional closing, WH-questions, No answers, reject, OR clause, down player, thanking, or the like.

For example, the sentiment analysis can include positive, neutral, and negative. For example, the user tracker information can include user context, user tone (formal/informal). For example, the subject identification can include subject of the at least one message.

The contextual modelling manager 136 can be configured to identify the user personalization information with respect to any of the application of the electronic device 100, and application context in order to extend the context of the first application in the second application. For example, the contextual modelling manager 136 can be configured to create a time bound event from the at least one received message "meet Suzanne" from the messaging application (i.e., the first application). Thus, whenever the user of the electronic device 100 detects a "calendar application" (i.e., second application) for setting a reminder then the time bound event is extended to the calendar application. If the electronic device 100 detects the input "meet" in the UI of the calendar application, then the text "Suzanne" is automatically predicted and displayed to the user of the electronic device 100.

Further, the contextual category detector 130 can be configured to communicate with the response predictor 140. The response predictor 140 includes a language model 142 (hereinafter used as LM 142). The LM 142 can be configured to include Language Model (LM) entries defined based on the contextual category of the received input. For example, if the contextual category of the received input is of type "PoV" i.e., "How do I look in in blue color shirt" then the predicted response can include, for example, text/words related to the PoV such as, "this color suits you", "blue color is too dark", "look good in blue color", and the like.

The response predictor 140 can communicate with one or more language model (LM) databases i.e., a preload LM 502, a user LM 504, and a time bound LM 506. The one or more LM databases can be configured to store the one or more LM entries. The response predictor 140 can be configured to retrieve the stored LM entries from the one or more LM databases. The one or more LM databases can be communicatively coupled to the storage 150 illustrated in FIG. 4.

In another embodiment, the one or more LM databases can be remotely located to the electronic device 100 and can be accessed through the one or more communication networks.

The preload LM 502 can include the statistical LM entry trained with plethora of corpus (user inputs) along with the semantic understanding. The user LM 504 can be dynamically created on the electronic device 100 and is trained based on the user activates (i.e., text, and graphical element(s) frequently used/accessed by the user in the event of responding/composing the message). Thus, the LM 142 can include a separate contextual category i.e., "X" component (shown below in Table.1) along with each unigram, bigram and trigram entries. For example, the LM 142 can be (N+X)/(NN+X), where N=N gram and NN=Neural net.

TABLE 1

| Language Model (LM) Category | | | |
|---|---|---|---|
| LM entry | Feature | "X" component | Frequency |

For example, the "X" component can include "X1-domain identification component", "X2-DA identification component", "X3-sentimental analysis component", "X4-PoV component", "X5-user tracker component" . . . Xn. In an embodiment of the present disclosure, the "X" component can be updated by training the corpus for preload LM 502. Further, the "X" component can be updated by learning user's activities (Sentence(s) being typed, chat, conversation, emails and the like).

For example, in the conventional methods and systems, the user-1 of the electronic device 100 receives the message "I am really sorry" from the user-2 of the electronic device (not shown). In the course of responding to the received message, the user-1 starts typing "No need to a . . . ," according to conventional methods and systems, all the features based on the user typed text are extracted, the features such as, for e.g., a unigram feature (e.g., "a"), a bigram feature ("to a"), and a trigram features ("need to a"). Further, Table. 2, below includes additional extracted text based on the text typed by the user.

TABLE 2

| Text extraction | | |
|---|---|---|
| Token | Feature | Probability |
| Alright | UNI | |
| Apocalypse | UNI | |
| apologize | UNI | |
| to_apologize | BI | |
| to_appear | BI | |
| need_to_apologize | TRI | |
| need_to_appear | TRI | |

Unlike to conventional methods and systems, the proposed method can be used to provide the predictions based on the contextual category of the received message from the user-2. The proposed contextual category detector 130 can be configured to identify the contextual category of the received message i.e., the message "I am really sorry" is of type "APOLOGY". Hence, LM entries corresponding to the contextual category 'APOLOGY' along with the unigram, the bigram, the trigram features are retrieved and displayed to the user of the electronic device 100 (as shown in Table.3).

TABLE 3

| LM entries | | | | |
|---|---|---|---|---|
| Token | Feature | DA | Domain | Probability |
| Alright | UNI | APOLOGY | | |
| apologize | UNI | APOLOGY | | |
| to_apologize | BI | APOLOGY | | |
| need_to_apologize | TRI | APOLOGY | | |

Further, the contextual category detector 130 can be configured to track the user-1 activities (response to the message sent by the user of the electronic device 100, predictions selected by the user of the electronic device 100, or the like), and alter (e.g., train, update, modify, etc.) the LM 142 based on the user activities.

Figure 6A:
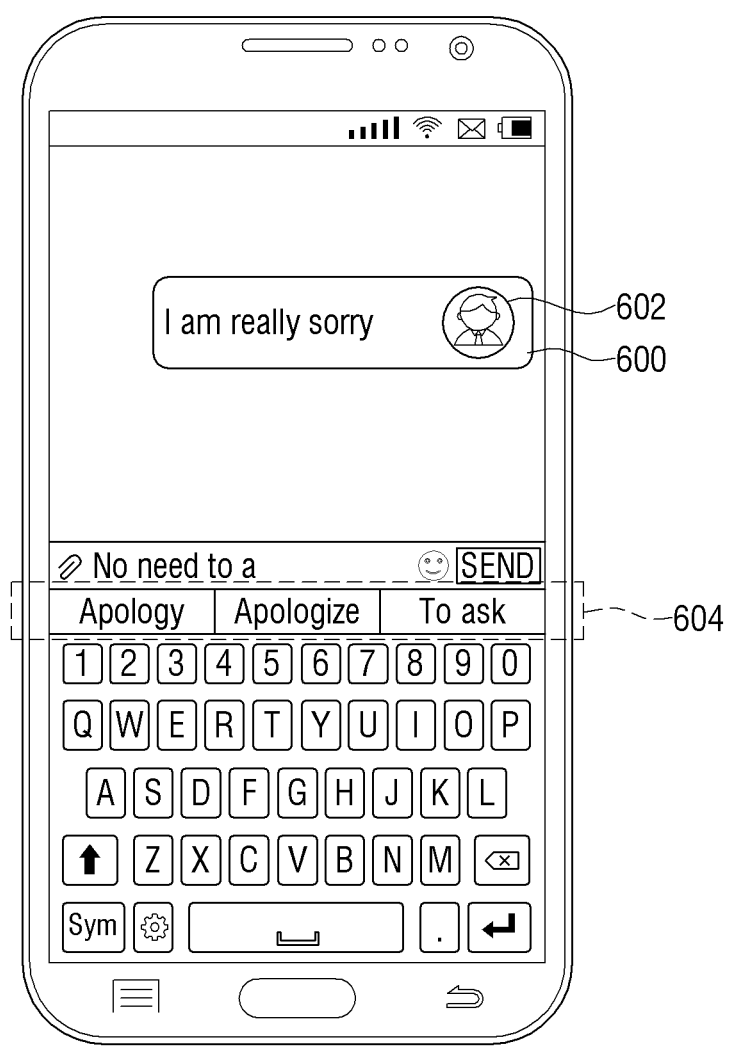
FIGS. 6A and 6B illustrate a UI for predicting subsequent meaningful prediction during composing of a response to the received message, according to embodiments disclosed herein.
Figure 6B:
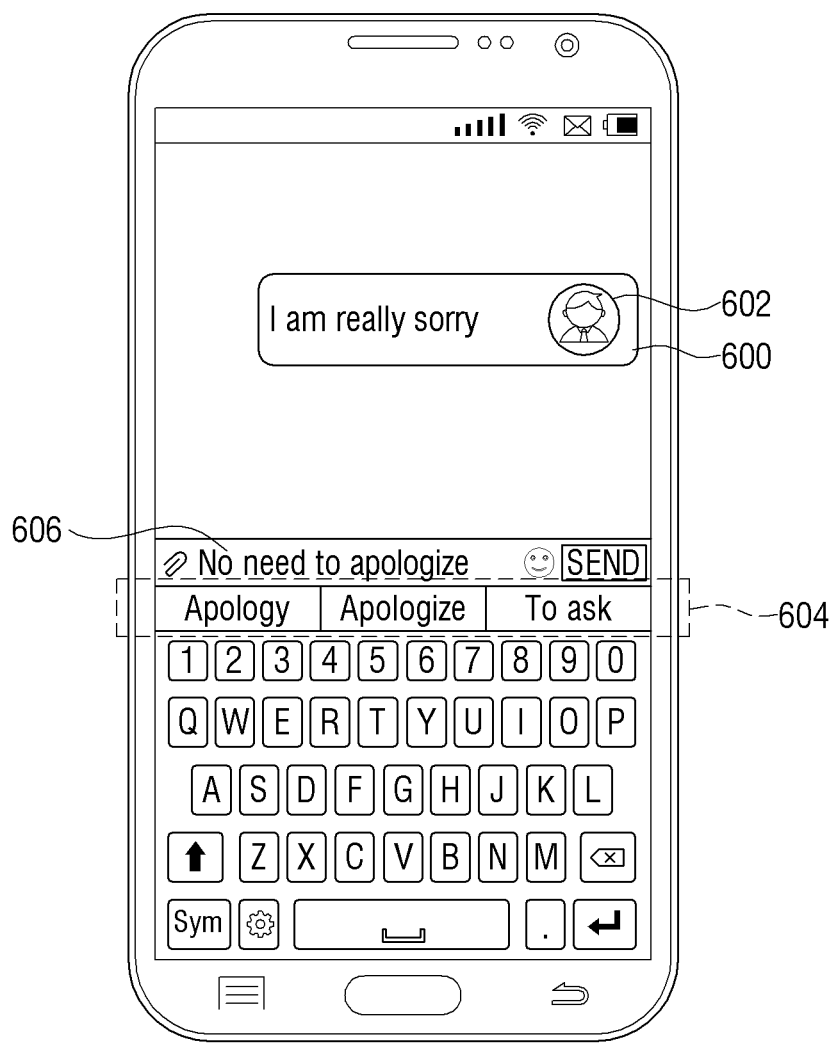

FIGS. 6A and 6B illustrate the UI for predicting subsequent meaningful prediction during composing of the response to the received message, according to embodiments disclosed herein.

For example, consider a scenario in which the user of the electronic device 100 receives a message 600 i.e., "I am really sorry" from one or more participant 602. The user of the electronic device 100 may intend to respond to the received message and starts typing/composing the text i.e., "No need to a . . . " Accordingly, the proposed method can be used to automatically predict the subsequent text/word of the in the sentence being composed (i.e., next meaningful word).

In order to predict the subsequent text/word in the sentence being composed, the information manager 120 can be configured to communicate the received message ("I am really sorry") with the contextual category detector 130 illustrated in FIG. 5. The contextual category detector 130 can be configured to identify the at least one contextual category of the received message i.e., the contextual category is of type "Apology". Further, the contextual category detector 130 can communicate with the response predictor 140 to retrieve the LM entries based on the contextual category "Apology".

The LM 142 can be configured to identify the at least one feature (i.e., unigram, bigram and trigram) from the text input provided, by the user of the electronic device 100, during the response. Thus, the LM 142 can be configured to retrieve the LM entries based on the at least one feature along with the contextual category "Apology" of the received message 600. Hence, the response predictor 140 can be configured to retrieve and display at least one subsequent response 604 i.e., "apologize", "apology", "be apologetic", or the like, from the LM 142 based on the contextual category of the received message 600. Hence, for example, sentence 606 being composed can be No need to "apologize" (as illustrated in FIG. 6B)

Figure 7:
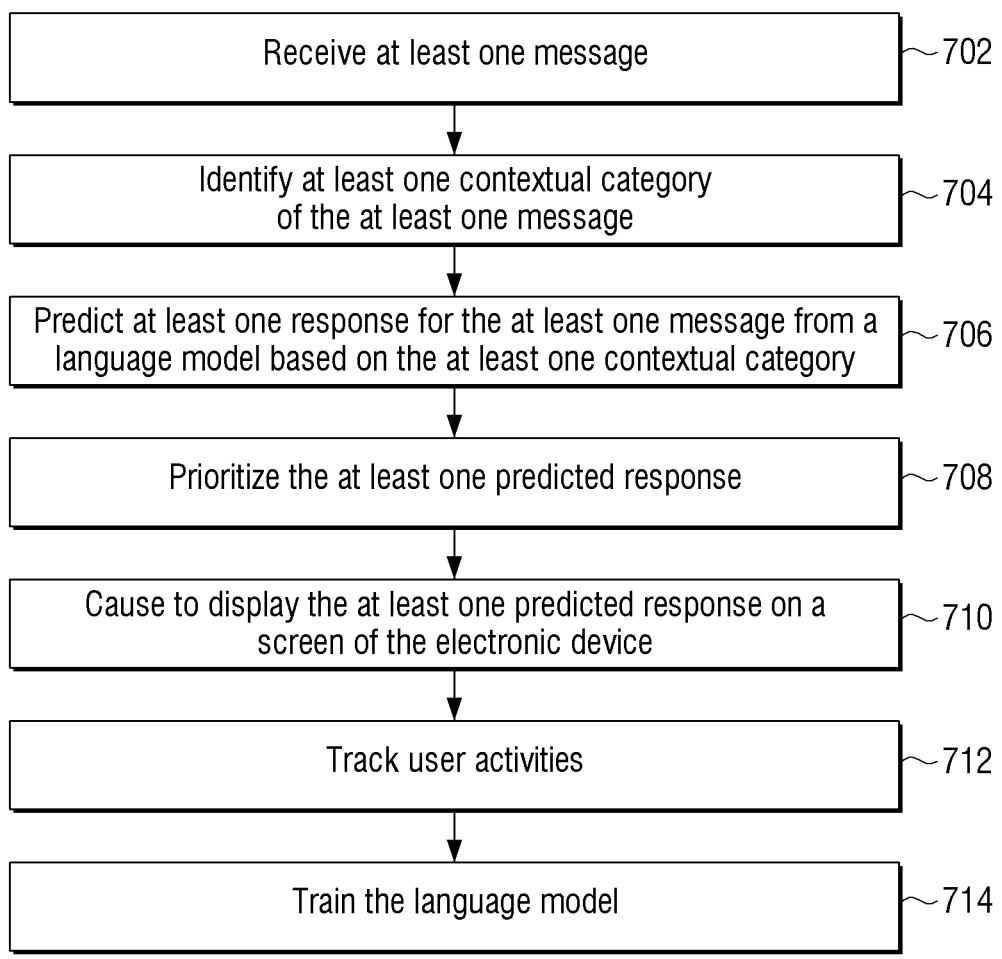
FIG. 7 is a flow diagram illustrating a method for predicting the response, according to an embodiment of the present disclosure.

FIG. 7 is a flow diagram illustrating a method for predicting the response, according to an embodiment of the present disclosure.

Referring to FIG. 7, at operation 702, the electronic device 100 may receive the at least one message. For example, in the electronic device 100 as illustrated in FIG. 4, the information manager 120 can be configured to receive the at least one message.

At operation 704, the electronic device 100 identifies the at least one contextual category of the at least one message. For example, in the electronic device 100 as illustrated in FIG. 4, the contextual category detector 130 can be configured to identify the at least one contextual category of the at least one message.

At operation 706, the electronic device 100 predicts the at least one response for the at least one message from the LM 142 based on the at least one contextual category. For example, in the electronic device 100 as illustrated in FIG. 4, the response predictor 140 can be configured to predict the at least one response for the at least one message from the LM 142 based on the at least one contextual category.

At operation 708, the electronic device 100 prioritizes the at least one predicted response. For example, in the electronic device 100 as illustrated in FIG. 4, the response predictor 140 can be configured to prioritize the at least one predicted response.

At operation 710, the electronic device 100 causes to display the at least one predicted response on the screen. For example, in the electronic device 100 as illustrated in FIG. 4, the response predictor 140 can be configured to cause to display the at least one predicted response on the screen.

At operation 712, the electronic device 100 tracks the user activities. For example, in the electronic device 100 as illustrated in FIG. 4, the contextual category detector 130 can be configured to track the user activities.

At operation 714, the electronic device 100 trains the LM 142. For example, in the electronic device 100 as illustrated in FIG. 4, the response predictor 140 can be configured to train the LM 142.

The various actions, acts, blocks, steps, etc., as illustrated in FIG. 7 may be performed in the order presented, in a different order, or simultaneously. Further, in some embodiments, some of the actions, acts, blocks, steps, etc., may be omitted, added, modified, skipped, etc., without departing from the scope of the disclosure.

Figure 8:
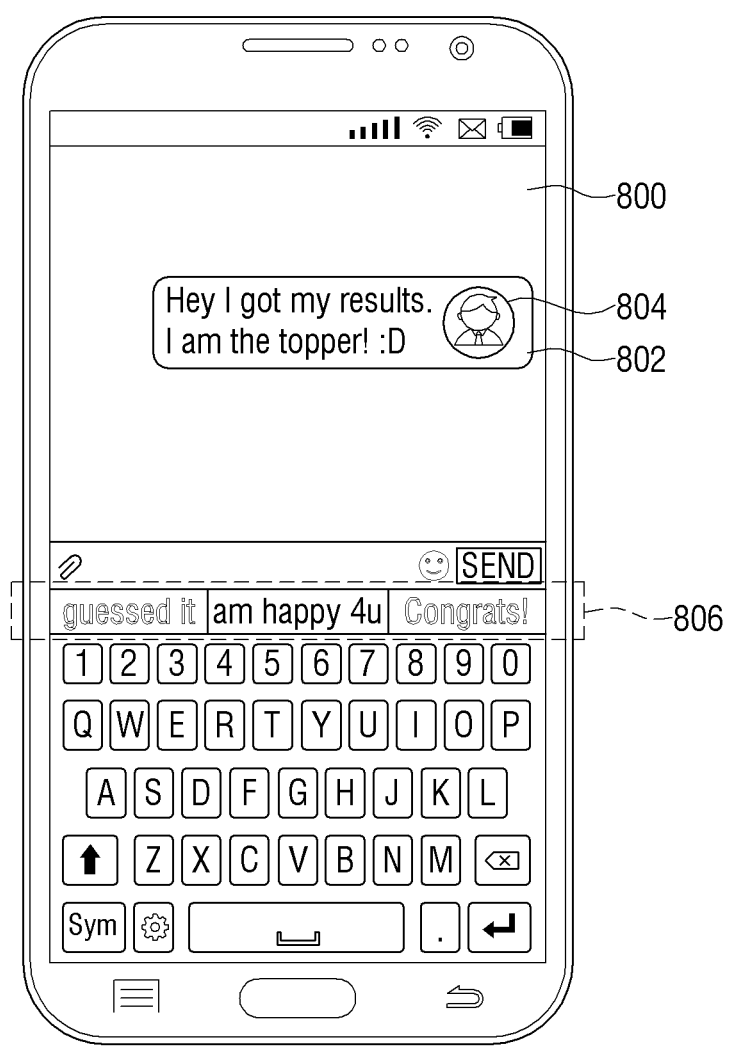
FIG. 8 illustrates a UI for responding to the message using the at least one predicted response, according to an embodiment of the present disclosure.

FIG. 8 illustrates a UI for responding to the message using the at least one predicted response, according to an embodiment of the present disclosure.

Referring to FIG. 8, the electronic device 100 may have a message transcript 800 showing the conversation between the user of the electronic device 100 and one or more participants, such as participant 804. The message transcript 800 may include a message 802, received from (an electronic device used by) the participant 804.

The content of the message 802 includes "Hey I got my results. I am the topper!" In an embodiment of the present disclosure, the proposed method can be used to determine at least one contextual category of the message 802 i.e., the contextual category of the received message 802 can be for e.g., "Appreciation". Further, the proposed method can be used to predict at least one response 806 i.e., "guessed it "am happy for you" "congrats", or the like from the LM 142 from the contextual category LM.

Figure 9A:
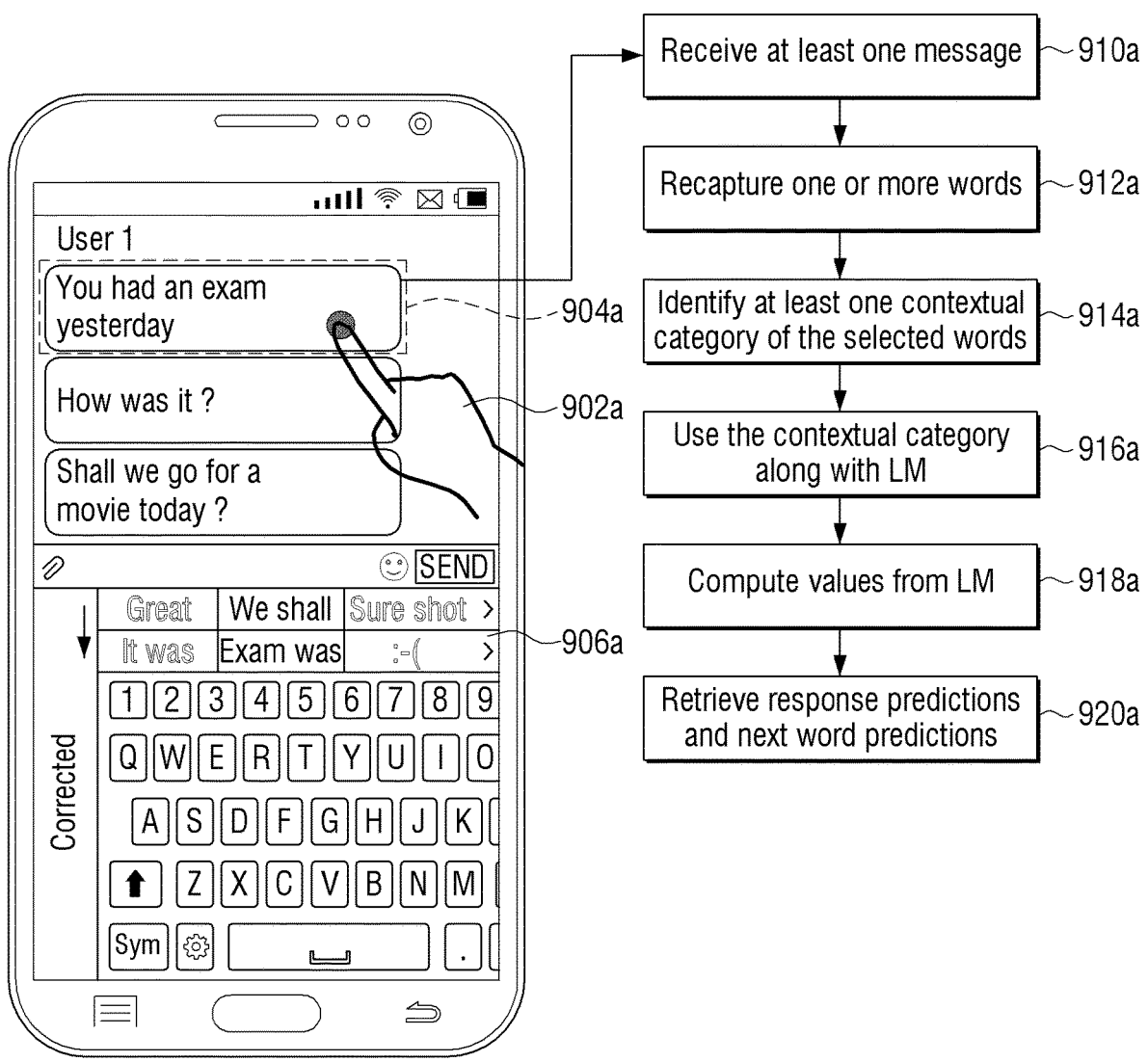
FIG. 9A is a step by step illustration for predicting response for a selected message from a plurality of messages, according to an embodiment of the present disclosure.

FIG. 9A is a step by step illustration for predicting response for a selected message from the plurality of messages, according to an embodiment of the present disclosure.

At operation 910a, the electronic device 100 may receive the at least one message. For example, in the electronic device 100 as illustrated in the FIG. 4, the information manager 120 can be configured to receive the at least one message.

For example, referring to the UI, the display 170 can be configured to detect an input 902a (i.e., tap, gesture, or the like) on at least one message 904a ("You had an exam yesterday") from the plurality of messages.

At operation 912a, the electronic device 100 may recapture one or more words. For example, in the electronic device 100 as illustrated in FIG. 4, the contextual category detector 130 can be configured to recapture one or more words.

At operation 914a, the electronic device 100 may identify at least one contextual category of the selected words. For example, in the electronic device 100 as illustrated in FIG. 4, the contextual category detector 130 can be configured to identify the at least one contextual category of the selected words.

At operation 916a, the electronic device 100 may use the contextual category along with the LM 142. For example, in the electronic device 100 as illustrated in FIG. 4, the response predictor 140 can be configured to use the contextual category along with the LM 142.

At operation 918a, the electronic device 100 may compute values (i.e., LM entries) from the LM 142. For example, in the electronic device 100 as illustrated in FIG. 4, the response predictor 140 can be configured to compute values from the LM 142.

At operation 920a, the electronic device 100 may retrieve the response predictions and next word predictions. For example, in the electronic device 100 as illustrated in FIG. 4, the response predictor 140 can be configured to retrieve the response predictions and next word predictions.

Thus, based on the user input 902a on the at least one message 904a, the response predictor 140 can be configured to dynamically update and display the response predictions and next word predictions 906a i.e., "It was", "Exam was", or the like.

Figure 9B:
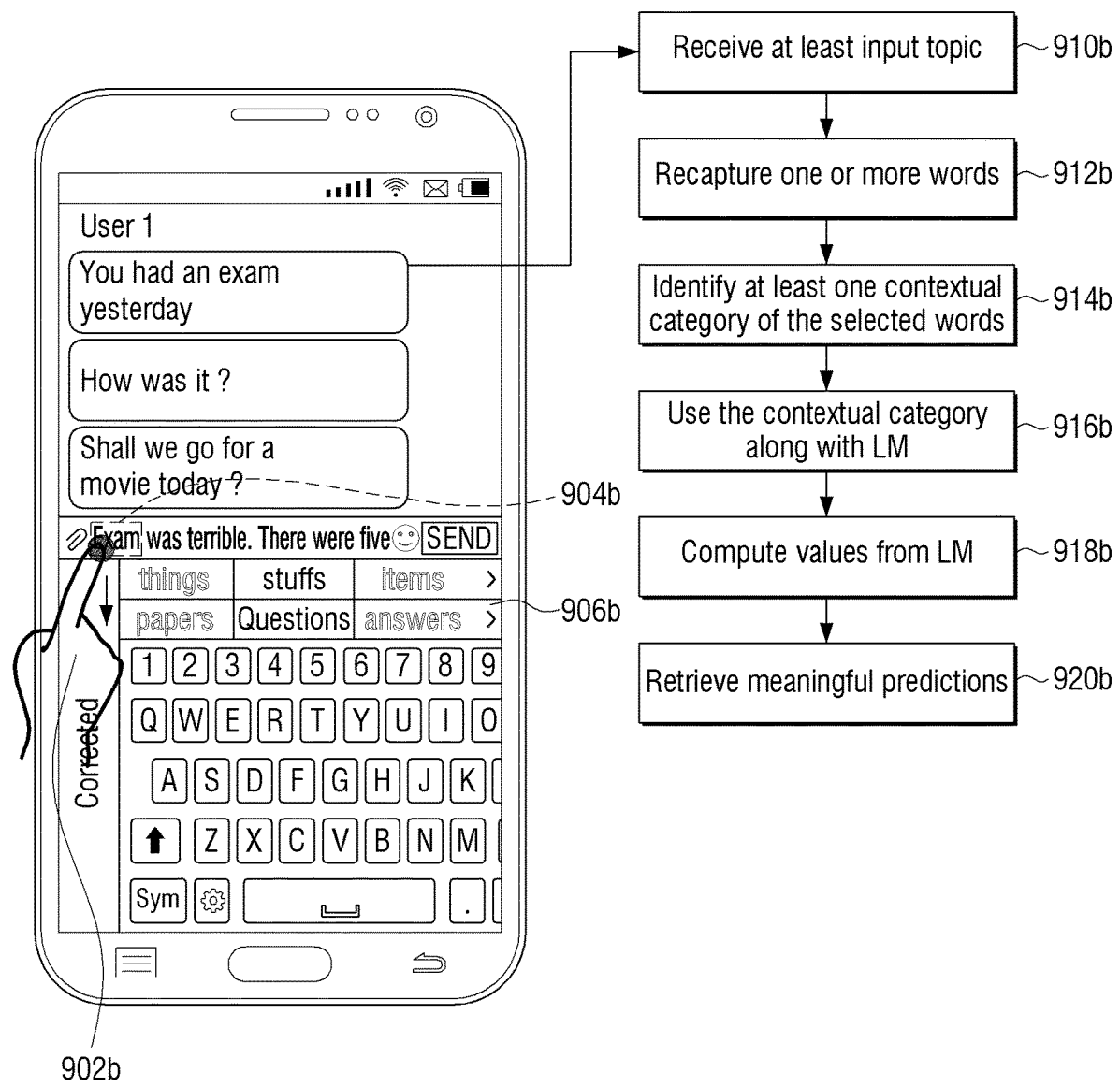
FIG. 9B is a step by step illustration for predicting response based for a selected input topic, according to an embodiment of the present disclosure.

FIG. 9B is a step by step illustration for predicting response based for a selected input topic, according to an embodiment of the present disclosure.

At operation 910b, the electronic device 100 may receive the at least input topic. For example, in the electronic device 100 as illustrated in FIG. 4, the information manager 120 can be configured to receive the at least input topic.

For example, referring to the UI, the display 170 can be configured to detect the input 902b (i.e., tap, gesture, or the like) on the input topic 904b (i.e., at least one word/text selected from the composing text).

At operation 912b, the electronic device 100 may recapture the one or more words. For example, in the electronic device 100 as illustrated in FIG. 4, the contextual category detector 130 can be configured to recapture the one or more words.

At operation 914b, the electronic device 100 may identify the at least one contextual category of the selected words. For example, in the electronic device 100 as illustrated in FIG. 4, the contextual category detector 130 can be configured to identify the at least one contextual category of the selected words.

At operation 916b, the electronic device 100 may use the contextual category along with the LM 142. For example, in the electronic device 100 as illustrated in FIG. 4, the response predictor 140 can be configured to use the contextual category along with the LM 142.

At operation 918b, the electronic device 100 may compute values from the LM 142. For example, in the electronic device 100 as illustrated in FIG. 4, the response predictor 140 can be configured to compute the values from the LM 142.

At operation 920b, the electronic device 100 may retrieve the meaningful predictions based on the composing text selection. For example, in the electronic device 100 as illustrated in FIG. 4, the response predictor 140 can be configured to retrieve (or, predict) the meaningful predictions based on the composing text selection.

Thus, based on the user input 902b on the at least one composing text, the response predictor 140 can be configured to dynamically update and display the meaningful predictions 906b (i.e., "It papers", "Questions", "answers", or the like) based on the composing text selection.

FIG. 10 is a flow diagram illustrating a method for predicting the response based on the statistical modelling manager, according embodiments as disclosed herein.

Referring to FIG. 10, at operation 1002, the electronic device 100 may receive the input topic from the first application. For example, in the electronic device 100 as illustrated in FIG. 4, the information manager 120 can be configured to receive the input topic from the first application.

At operation 1004, the electronic device 100 may identify the at least one contextual event associated with the second application. For example, in the electronic device 100 as illustrated in FIG. 4, the contextual category detector 130 can be configured to identify the at least one contextual event associated with the second application.

At operation 1006, the electronic device 100 may predict the at least one response for the at least one input topic from the first application based on the at least one contextual event. For example, in the electronic device 100 as illustrated in FIG. 4, the response predictor 140 can be configured to predict the at least one response for the at least one input topic from the first application based on the at least one contextual event.

At operation 1008, the electronic device 100 may compute dynamic-interpolation-weights ($\lambda 1, \lambda 2, \lambda 3$) of each LM database (i.e., the preload LM 502, the user LM 504, the time bound LM 506). The dynamic-interpolation-weights can be used to prioritize words among the LM databases.

At operation 1010, the electronic device 100 may find probabilities ($P_{PLM}, P_{ULM}, P_{TLM}$) of 'WORD' from each of the LM databases (i.e., the preload LM 502, the user LM 504, the time bound LM 506 respectively).

At operation 1012, the electronic device 100 may calculate Pc (combined probability) for each of the word(s) retrieved from each of the each of the LM databases (i.e., LM models) and prioritize the predictions based on the Pc (or, based on the parameters such as Relevancy, sort by recent and so on). For example, in the electronic device 100 as illustrated in FIG. 4, the response predictor 140 can be configured to calculate the Pc (combined probability) for each of the word(s) retrieved from each of the each of the LM databases (i.e., LM models).

At operation 1014, the electronic device 100 may cause to display the at least one predicted response on the screen. For example, in the electronic device 100 as illustrated in FIG. 4, the response predictor 140 can be configured to cause to display the at least one predicted response on the screen.

At operation 1016, the electronic device 100 may track the user activities. For example, in the electronic device 100 as illustrated in FIG. 4, the response predictor 140 can be configured to track the user activities.

At operation 1018, the electronic device 100 may train the LM 142. For example, in the electronic device 100 as illustrated in FIG. 4, the response predictor 140 can be configured to train the LM 142 based on the user activities and LM entries retrieved from each of the LM database.

Figure 11:
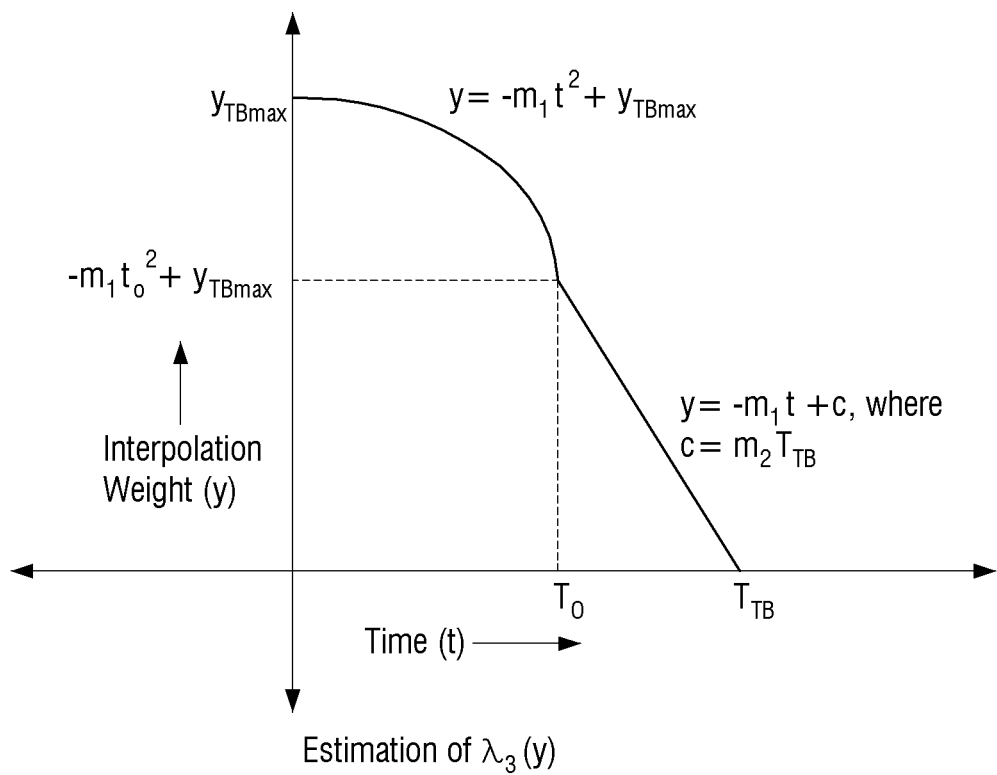
FIG. 11 is a graph illustrating of computing dynamic interpolation weights with time bound, according to an embodiment of the present disclosure.

FIG. 11 is a waveform for computing dynamic interpolation weights with time bound, according to an embodiment of the present disclosure.

Table. 4 (shown below) tabulates the dynamic interpolation weights for each of the LM database with time bound LM and without time bound LM.

TABLE 4

| LM database | Interpolation weights | | | |
|---|---|---|---|---|
| | $\lambda 1$ | $\lambda 2$ | $\lambda 3$ | $\Sigma \lambda_i$ |
| Without Time Bound LM | 0.7 | 0.3 | 0 | 1 |
| With Time Bound LM | $(1 - y) * 0.7$ | $(1 - y) * 0.3$ | Y | 1 |

The electronic device 100 can be configured to estimate interpolation weight ($\lambda 3$) with the time bound LM using the equation (7).

$$y = \begin{cases} -m_2 t^2 + y_{TBmax}; & 0 < t <= T_O \quad \text{(Parabolic)} \\ -m_2 t + m_2 T_{TB}; & T_O < t < T_{TB} \quad \text{(Linear)} \end{cases} \quad (7)$$

where $m_1$ *and* $m_2$=rate of change of interpolation weight with respect to time;

$y_{TBmax}$=maximum interpolation weight for Time Bound LM $T_{TB}$=Time limit for Time Bound LM
$T_O$=Value that lies between 0 and $T_{TB}$
$T_O \in [0, T_{TB}]$ $$y = \begin{cases} -(y_{TBmax}/T_{TB})*t + y_{TBmax}; & (T_{O==}0) \\ -(y_{TBmax}/T_{TB}^2)*t^2 + y_{TBmax}; & (T_{O==}T_{TB}) \end{cases} \quad (8)$$

Figure 12A:
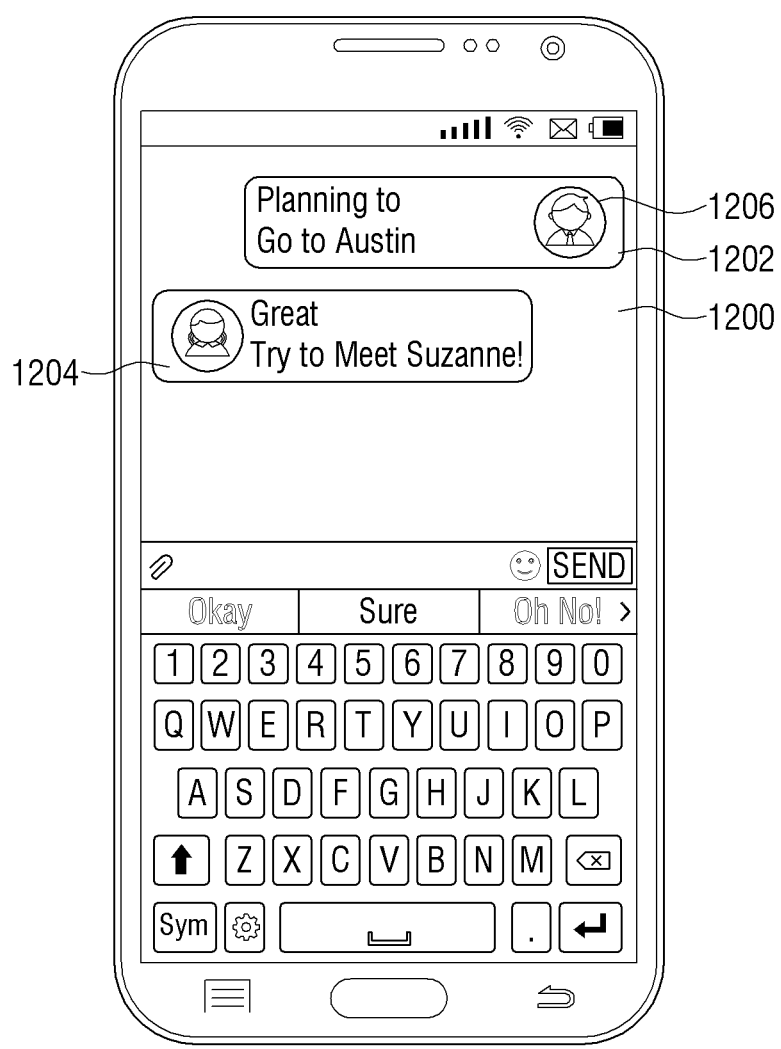
FIGS. 12A and 12B illustrate a UI in which the contextual event from the received message is identified and extended from first application to second application, according to an embodiment of the present disclosure.
Figure 12B:
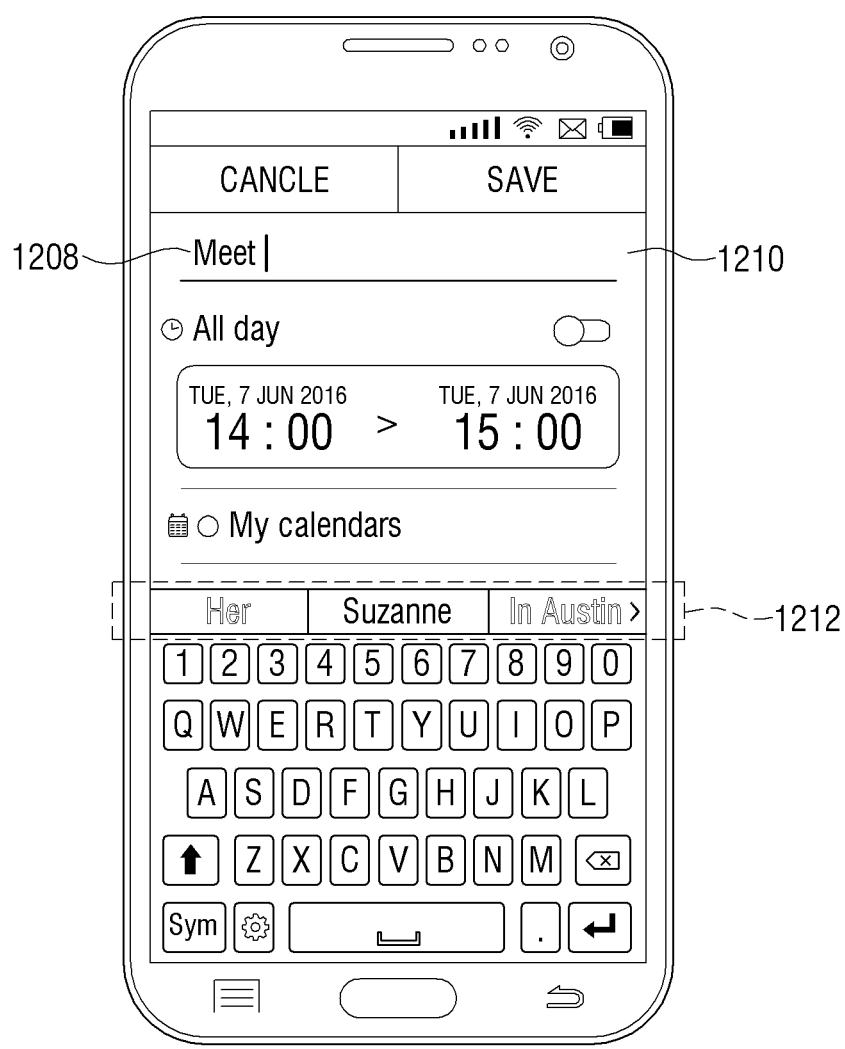

FIGS. 12A and 12B illustrate a UI in which the contextual event from the received message is identified and extended from first application to second application, according to an embodiment of the present disclosure.

Referring to FIG. 12A, the electronic device 100 may have a message transcript 1200 showing the conversation between the user of the electronic device 100 and one or more participants, such as participant 1206. The message transcript 1200 may include a message 1202 received from the participant 1206 and message 1204 sent by the user of the electronic device 100.

The contextual category detector 130 illustrated in FIG. 4 can be configured to identify the contextual event (i.e., fixed time bound, semantic time bound, and contextual time bound) associated with the message 1202 and the message 1204. The message 1204 includes "Great!! Try to Meet Suzanne!" The LM entries during the fixed time bound are managed via parabolic/linear on time e.g., reduce priority/frequency over time. The LM entries during semantic time bound may not be useful after trip and thereby the LM 142 may delete the entry by understanding the message. The contextual time bound is more useful in the communication relate applications and prioritizes entry based on the application context.

Referring to FIG. 12B, the user of the electronic device 100 may launch the calendar application for setting a reminder. When the user of the electronic device 100 composes, using the keypad, a text 1208 "meet" in an input tab of the calendar application 1210, then the next response 1212 "Suzanne" can be automatically predicted and displayed on the screen (e.g., in the text prediction tab of the keypad., default area defined by OEM, default area defined by the user, etc.,) of the electronic device 100.

Accordingly, the proposed method of the present disclosure can be used to provide the meaningful predictions. The proposed method can be used to extend contextual event of the messaging application and provide predictions in the application.

Figure 13A:
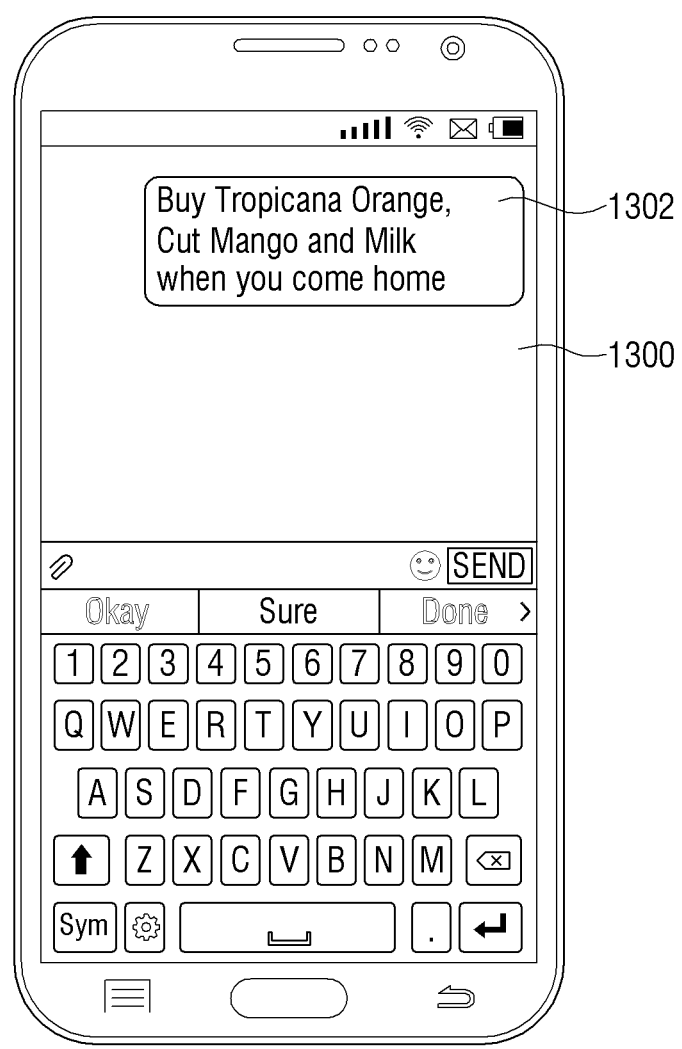
FIGS. 13A and 13B illustrate another UI in which the contextual event from the received message is identified and extended from first application to second application, according to an embodiment of the present disclosure.
Figure 13B:
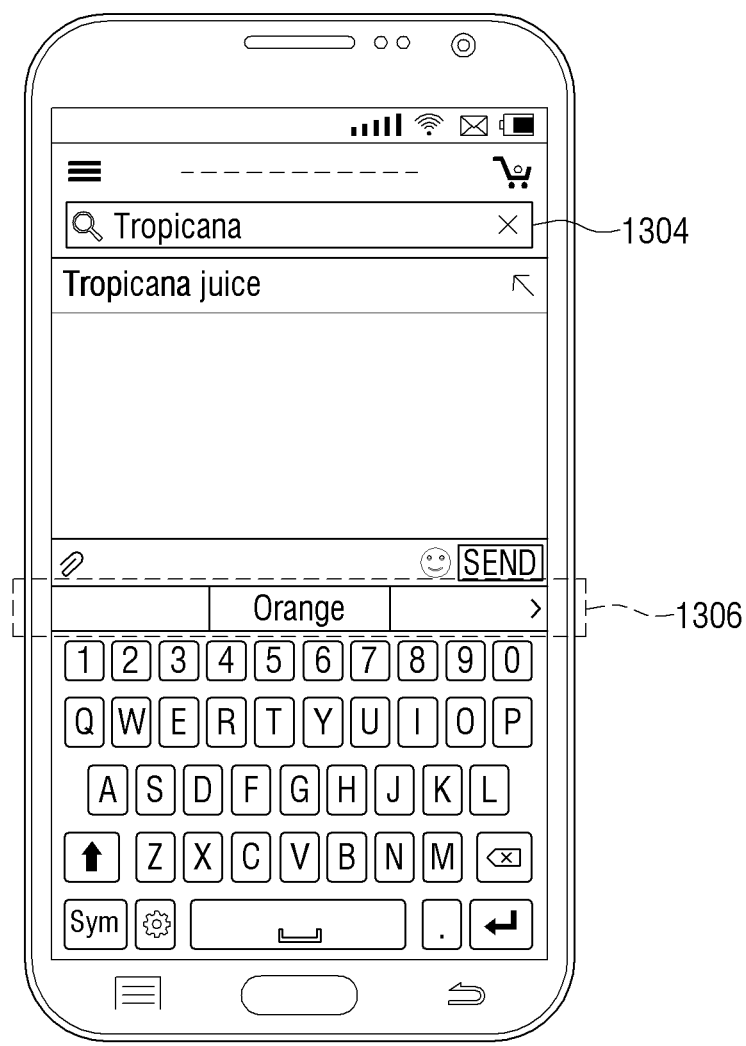

FIGS. 13A and 13B illustrate another UI in which the contextual event from the received message is identified and extended from first application to second application, according to an embodiment of the present disclosure.

Referring to FIG. 13A, the electronic device 100 may have a message transcript 1300 showing the message received from one or more participants. The message transcript 1300 may include the message 1302 received from the participant.

The contextual category detector 130 can be configured to identify the contextual event (i.e., fixed time bound, semantic time bound, and contextual time bound) associated with the message 1302. The message 1302 includes "Buy Tropicana orange, cut mango and milk when you come home".

Referring to FIG. 13B, the user of the electronic device 100 may launch (access/open) a shopping application (i.e., related application to that of the contextual event). When the user of the electronic device 100 composes, using the keypad, at least one text 1304 ("Tropicana") from the message 1302 in the input tab of the shopping application, then the next word(s) 1306 "Orange", "cut mango", Milk, or the like can be automatically predicted and displayed on the screen (e.g., in the text prediction tab of the keypad., default area defined by the OEM, default area defined by the user, etc.,) of the electronic device 100.

Figure 14A:
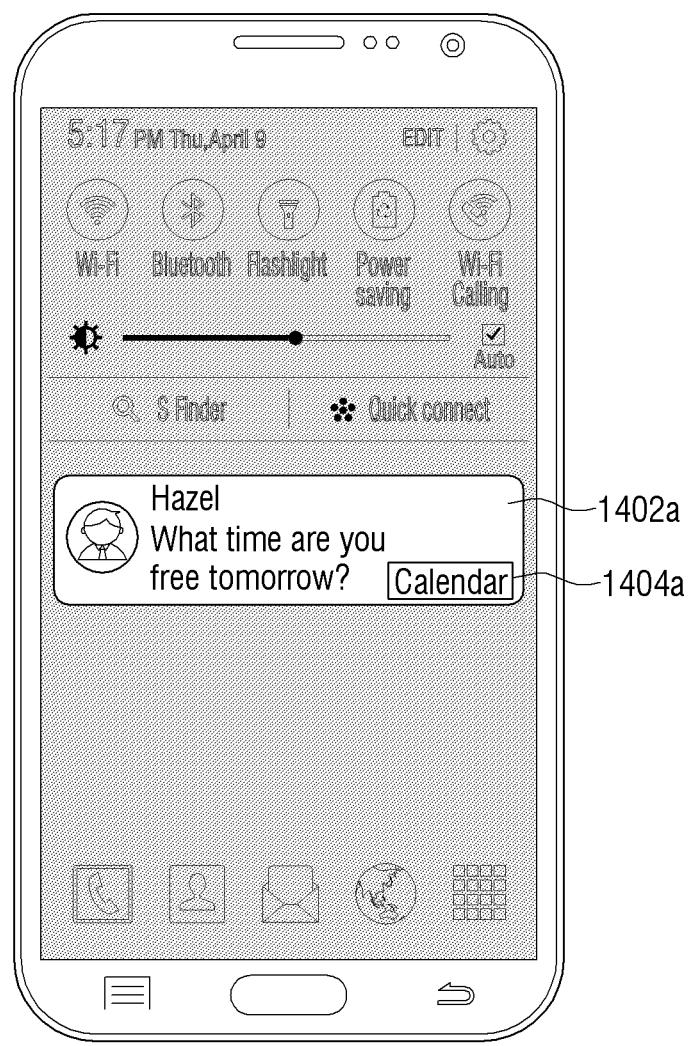
FIG. 14A illustrates a UI in which a contextual related application based on the received message is predicted and displayed on the screen of the electronic device, according to an embodiment of the present disclosure.

FIG. 14A illustrates an exemplary UI in which a contextual related application based on the received message is predicted and displayed on the screen of the electronic device, according to an embodiment of the present disclosure.

Referring to FIG. 14A, the user of the electronic device 100 may receive a message 1402a from one or more participants. The contextual category detector 130 can be configured to detect the at least one contextual event (i.e., contextual time bound event) associated with the message 1402a. Thus, based on the contextual time bound event, the response predictor 140 can be configured to predict and display the at least one contextual related application.

As illustrated in FIG. 14A, based on the contextual time bound event a related application i.e., a graphical icon 1404a of the calendar application can be predicted and displayed on the screen of the electronic device 100.

Figure 14B:
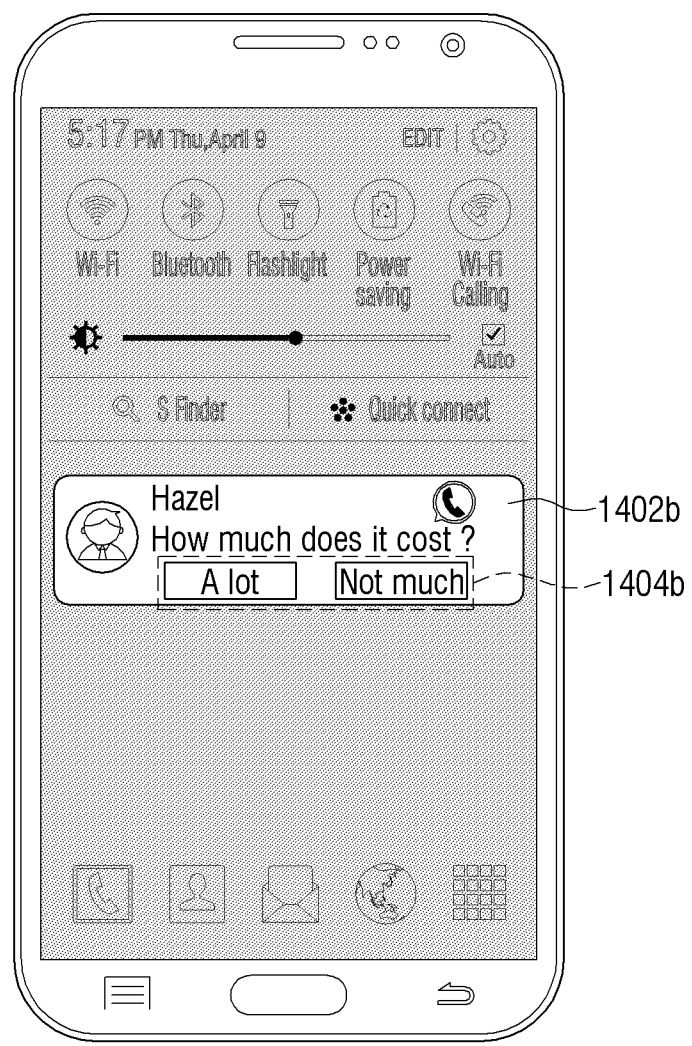
FIG. 14B illustrates a UI in which the predicted response for the message is displayed within the notification area of the electronic device, according to an embodiment of the present disclosure.

FIG. 14B illustrates a UI in which the predicted response for the message is displayed within the notification area of the electronic device, according to an embodiment of the present disclosure.

Referring to FIG. 14B, the electronic device 100 may receive a message 1402b from one or more participants. The at least one predicted response 1404b for the message 1402b is automatically predicted and displayed within the notification area of the electronic device 100.

Unlike to conventional methods and systems, the proposed method can be used to provide the response predictions for the message(s) received without launching the message application.

Figure 15:
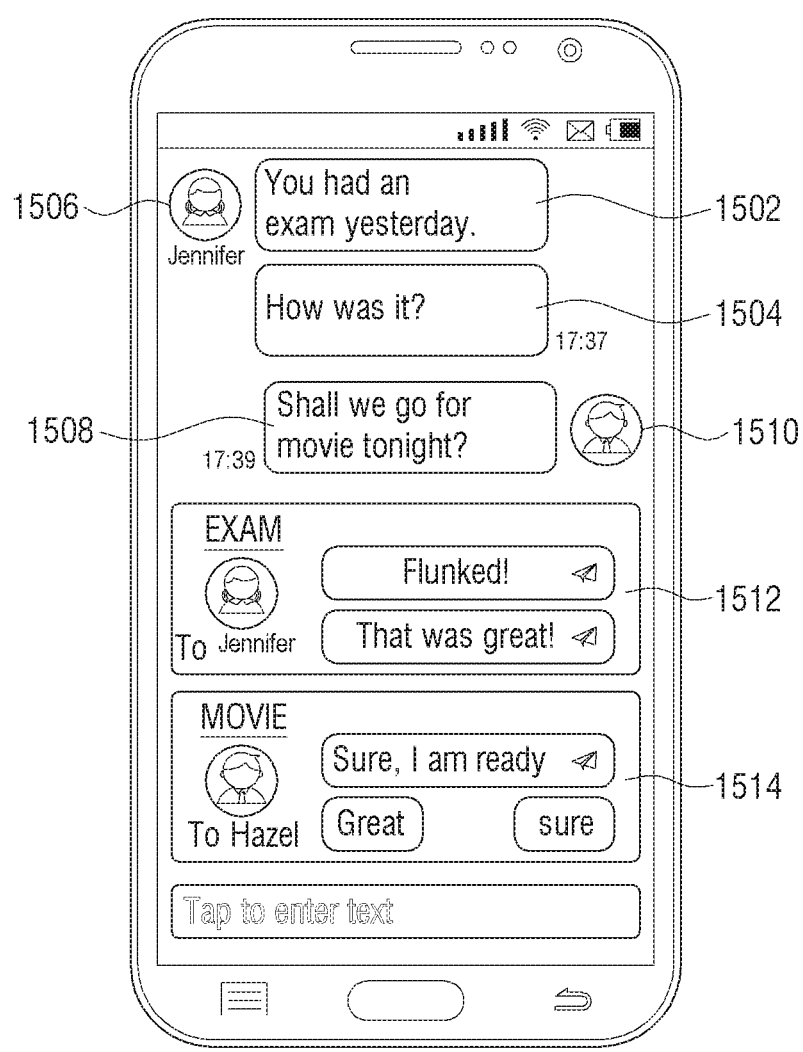
FIG. 15 illustrates a UI in which multiple response messages are predicted based on contextual grouping of the related messages, according to an embodiment of the present disclosure.

FIG. 15 illustrates a UI in which multiple response messages are predicted based on contextual grouping of the related messages, according to an embodiment of the present disclosure.

Referring to FIG. 15, the user of the electronic device 100 may receive messages 1502 and 1504 from a participant 1506, and a message 1508 from a participant 1510. The contextual category detector 130 can be configured to identify one or more contextual category of the messages 1502 (i.e., "You had an exam yesterday) and 1504 ("how was it"). Further, based on the one or more contextual category (i.e., both the messages 1502 and 1504 are received from same participant 1506, content available in both the messages 1502 and 1504 are contextually related, and the like) the response predictor 140 can be configured to predict one or more response messages and group 1512 the one or more predicted responses. Similarly, based on the one or more contextual category (i.e., of the message 1508, content available in the message 1508, or the like) the response predictor 140 can be configured to predict one or more response messages and group 1514 the one or more predicted responses.

Unlike to conventional methods and systems, the proposed method can be used to provide the response prediction by considering individual or group conversations, one or more queries from one or more participants are addressed, one or more queries from the user of the electronic device 100, and the like.

Figure 16A:
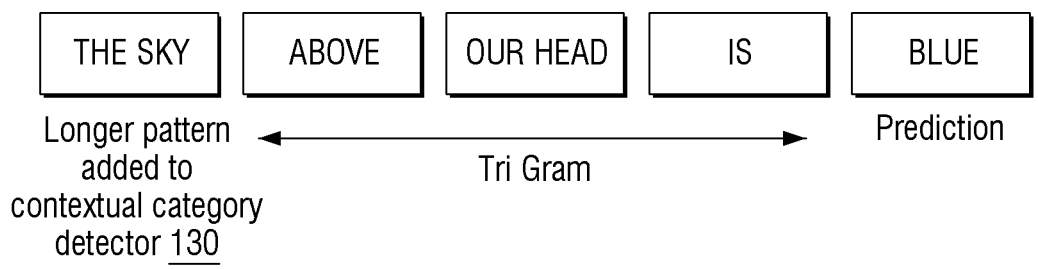
FIGS. 16A and 16B illustrate longer pattern scenarios in which the meaningful response (i.e., next suggestion word) is predicted in a longer pattern sentence, according to an embodiment of the present disclosure.
Figure 16B:
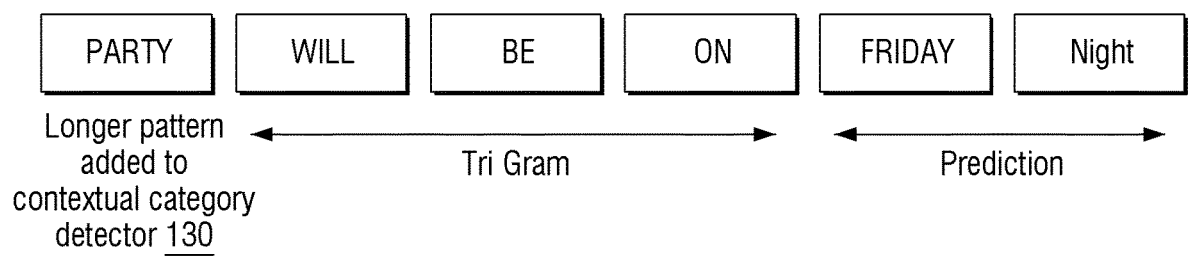

FIGS. 16A to 16B illustrate a longer pattern scenario in which the meaningful response (next suggested word) is predicted in the longer pattern sentence, according to an embodiment of the present disclosure.

Referring to FIG. 16A, the electronic device 100 detects the input topic i.e., composed text of longer sentence pattern i.e., "the sky above our head is . . . " Unlike to conventional methods and systems, the proposed context category manager 130 can be configured to analyze the received input topic and identify the at least one contextual category of the received input topic. Thus, based on the at least one content "The Sky" available in the input topic, the response predictor 140 can be configured to predict and display the response (next word) "Blue".

Thus, the LM 142 utilizes the contextual input class (to include longer pattern) along with N Gram (Tri gram) language model. Unlike to conventional methods and systems, the proposed method can provide the response predictions by considering only selective inputs ("the sky") and not the whole longer pattern.

Similarly, referring to FIG. 16B, the selective input ("party") is considered and accordingly the response "Friday night" is predicted and displayed on the screen of the electronic device 100.

Figure 17:
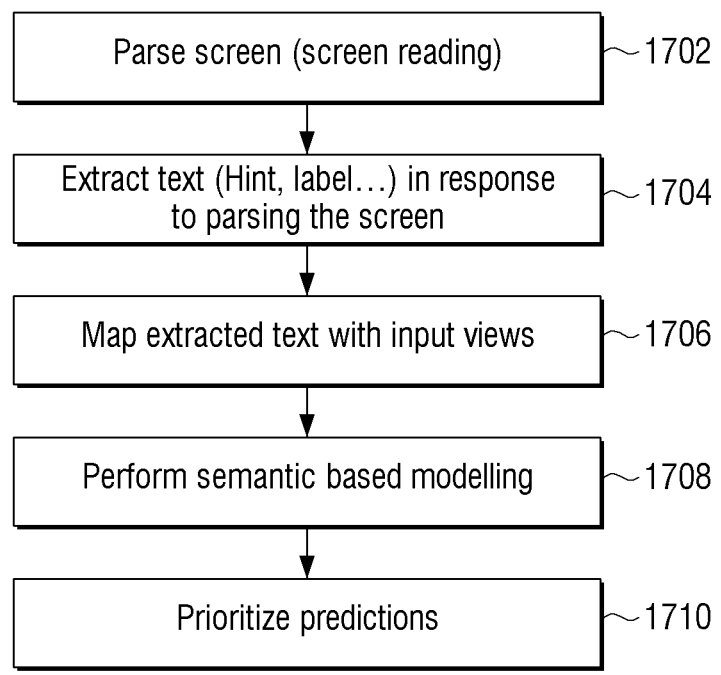
FIG. 17 is a flow diagram illustrating a method for predicting the response by understanding input views rendered on the screen of the electronic device, according to an embodiment of the present disclosure.

FIG. 17 is a flow diagram illustrating a method for predicting the response by understanding input views rendered on the screen of the electronic device, according to an embodiment of the present disclosure.

At operation 1702, the electronic device 100 may parse the information rendered on the screen (screen reading). For example, in the electronic device 100 as illustrated in FIG. 4, the contextual category detector 130 can be configured to parse the information rendered on the screen (screen reading).

At operation 1704, the electronic device 100 may extract the text (i.e., hint, label, or the like) in response to parsing the screen. For example, in the electronic device 100 as illustrated in FIG. 4, the contextual category detector 130 can be configured to extract the text in response to parsing the screen.

At operation 1706, the electronic device 100 may map the extracted text with the input views. For example, in the electronic device 100 as illustrated in FIG. 4, the contextual category detector 130 can be configured to map the extracted text with the input views.

At operation 1708, the electronic device 100 may perform a semantic based modelling. Further, at operation 1710, the electronic device 100 prioritize the predictions.

Figure 18A:
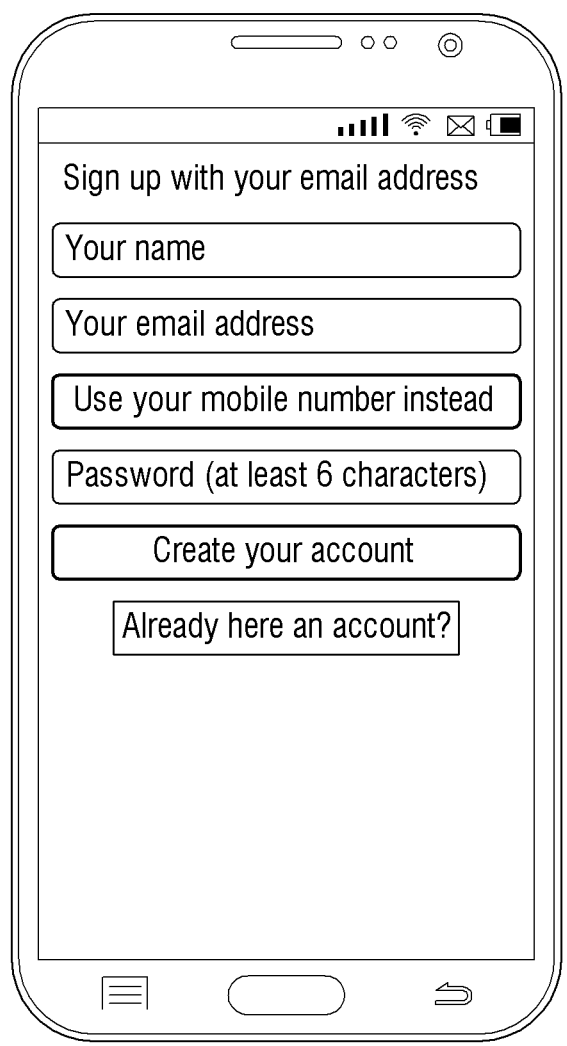
FIGS. 18A to 18C illustrate the UI displaying at least one predicted response by understanding input views rendered on the screen of the electronic device, according to an embodiment of the present disclosure.
Figure 18B:
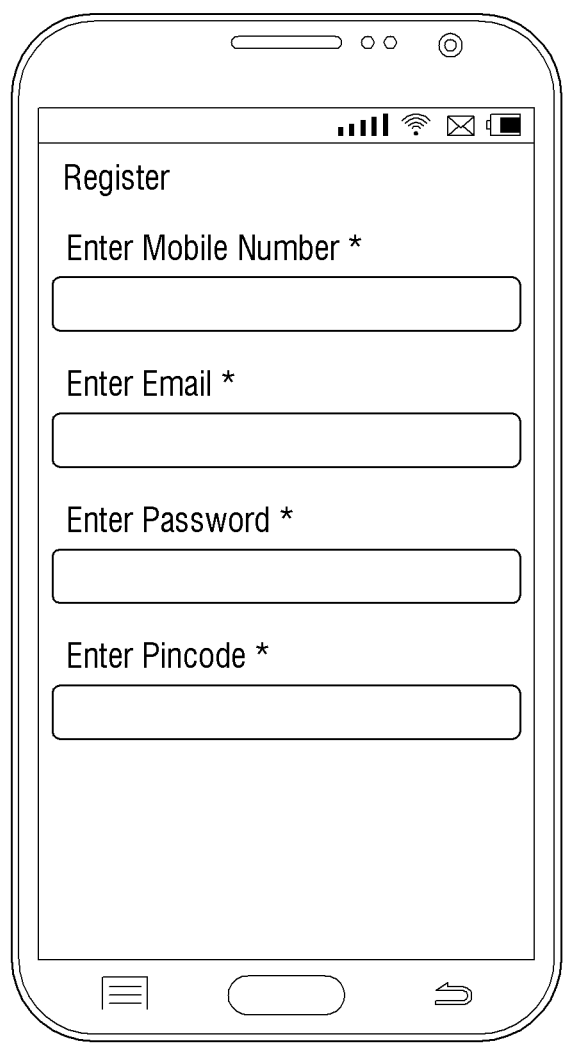
Figure 18C:
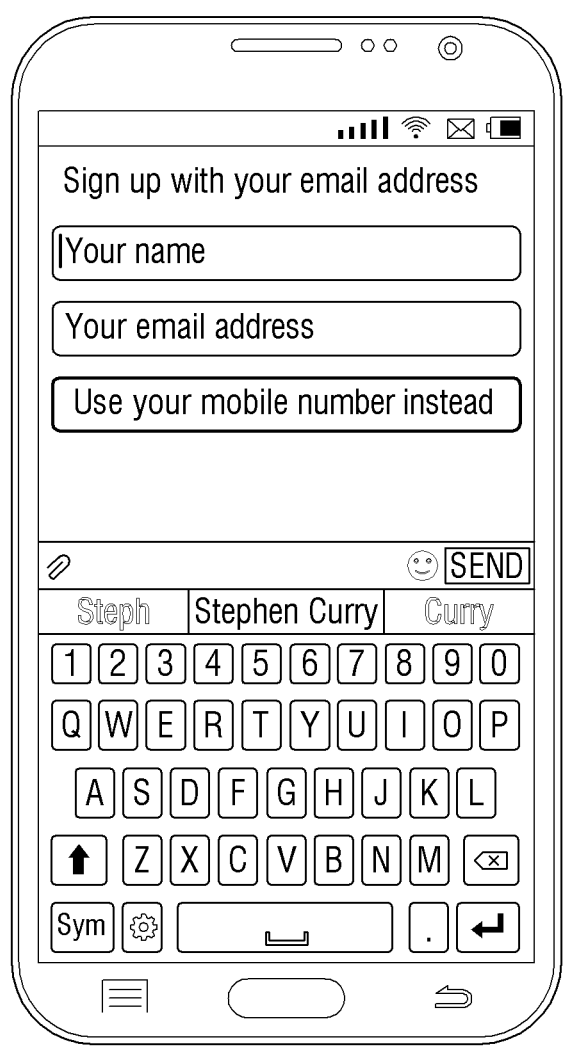

FIGS. 18A to 18C is a UI displaying at least one predicted response by understanding input views rendered on the screen of the electronic device, according to an embodiment of the present disclosure.

The electronic device 100 can be configured to parse the information rendered on the screen i.e., identifying the text rendered on the screen. The texts (i.e., input views, hints, labels, or the like) on the screen such as "your name", "Your email address", "password", "enter password", "enter email", or the like, are parsed and provided to the contextual category detector 130 as illustrated in FIG. 4. The contextual category detector 130 can be configured to identify the contextual category of the text parsed i.e., "Your name" is of category "subject", "you phone number" is of category "contacts", etc., identified from the contextual LM database. Further, the prediction detector 140 illustrated in FIG. 4 can be configured to display the response predictions based on the input views/input text field in accordance with the at least one category determined. The response predictions for the input text field "Your name" can be "steph", "curry", or the like.

Figure 19A:
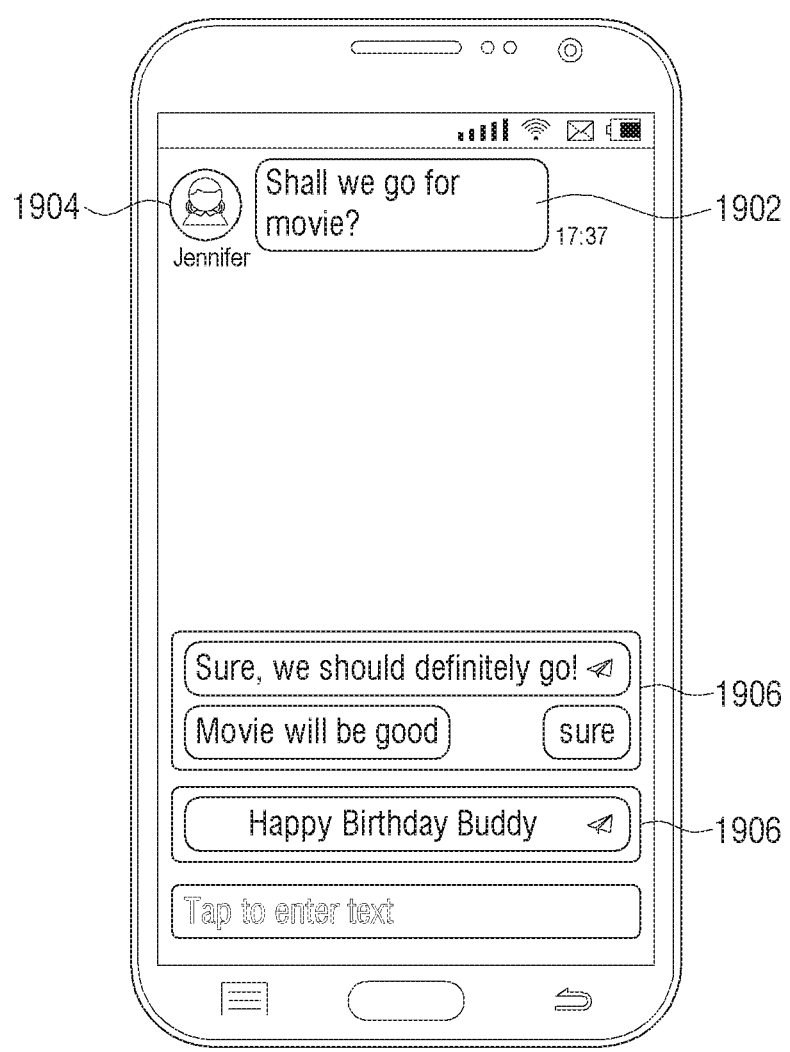
FIGS. 19A to 19C illustrate the UI displaying multiple predicted response based on at least one event associated with at least one participant, according to an embodiment of the present disclosure.
Figure 19B:
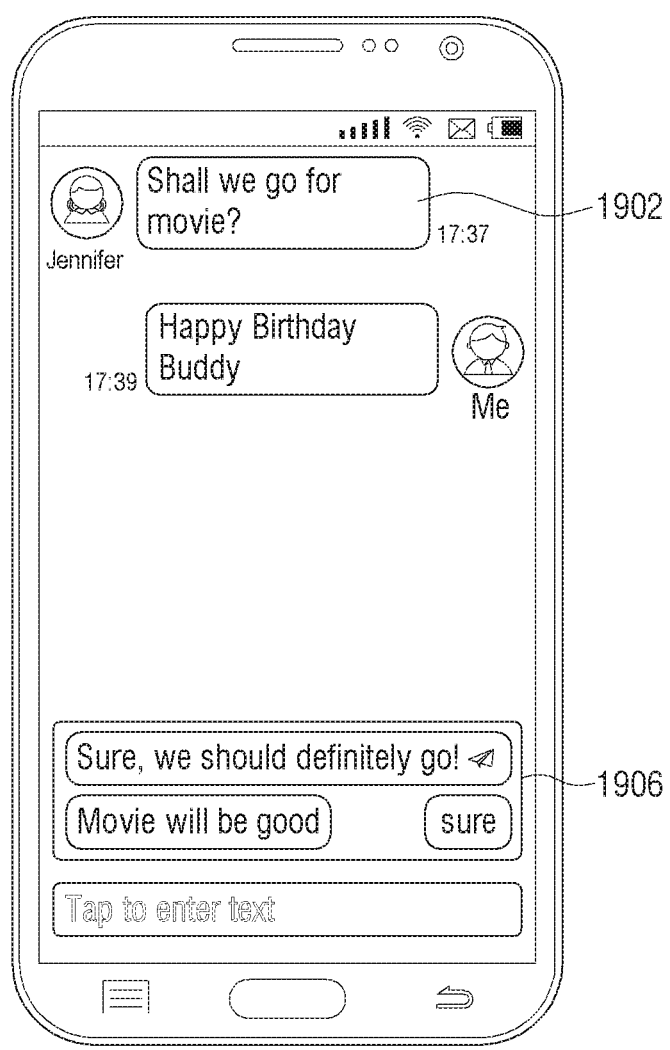
Figure 19C:
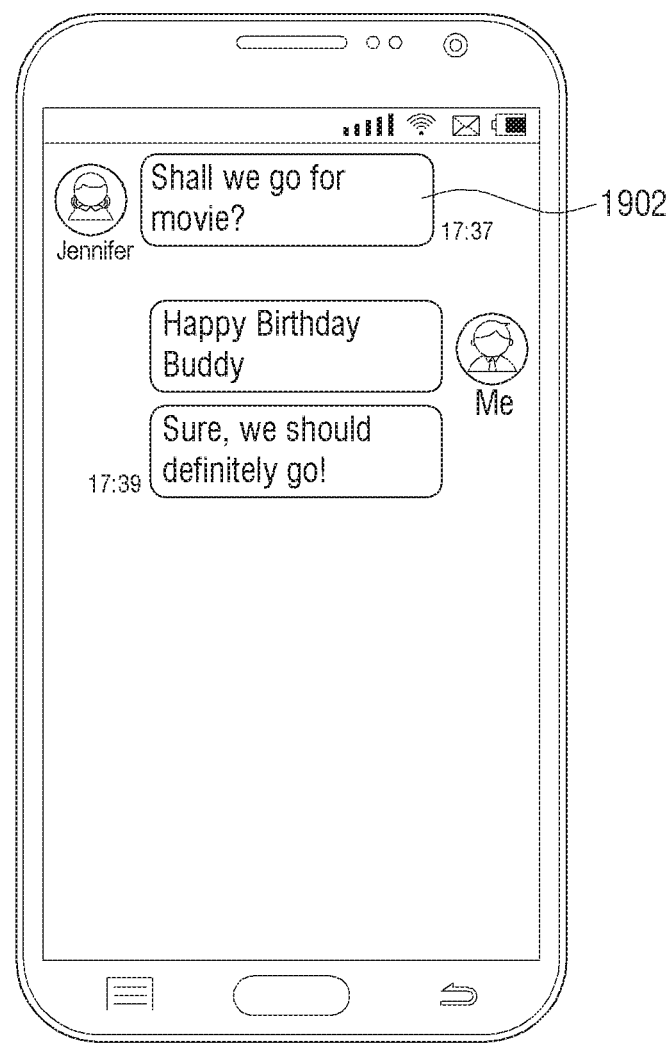

FIGS. 19A to 19C illustrate a UI displaying multiple predicted response based on at least one event associated with at least one participant, according to an embodiment of the present disclosure.

For example, consider a scenario in which the user of the electronic device 100 may receive at least one message 1902 from the at least one participant 1904. Unlike to conventional methods and systems, the proposed contextual category detector 130 can be used to identify at least one event (e.g., birthday event, anniversary event, etc.) associated with the participant 1904. The at least one event can be automatically retrieved from the at least one application (e.g., calendar application, SNS application, etc.,) associated with the electronic device 100.

Hence, based on the least one event the response predictor 140 can be configured to predict, prioritize and display multiple responses. For example, if the content of the message 1902 includes "shall we go for movie?", then the response predictor 140 can be configured to provide the response predictions 1906 i.e., "Sure, we should definitely go", "movie will be good", Sure. Further, the response predictions 1906 can include the response predicted based on the event detection i.e., "Happy birthday buddy."

Figure 20A:
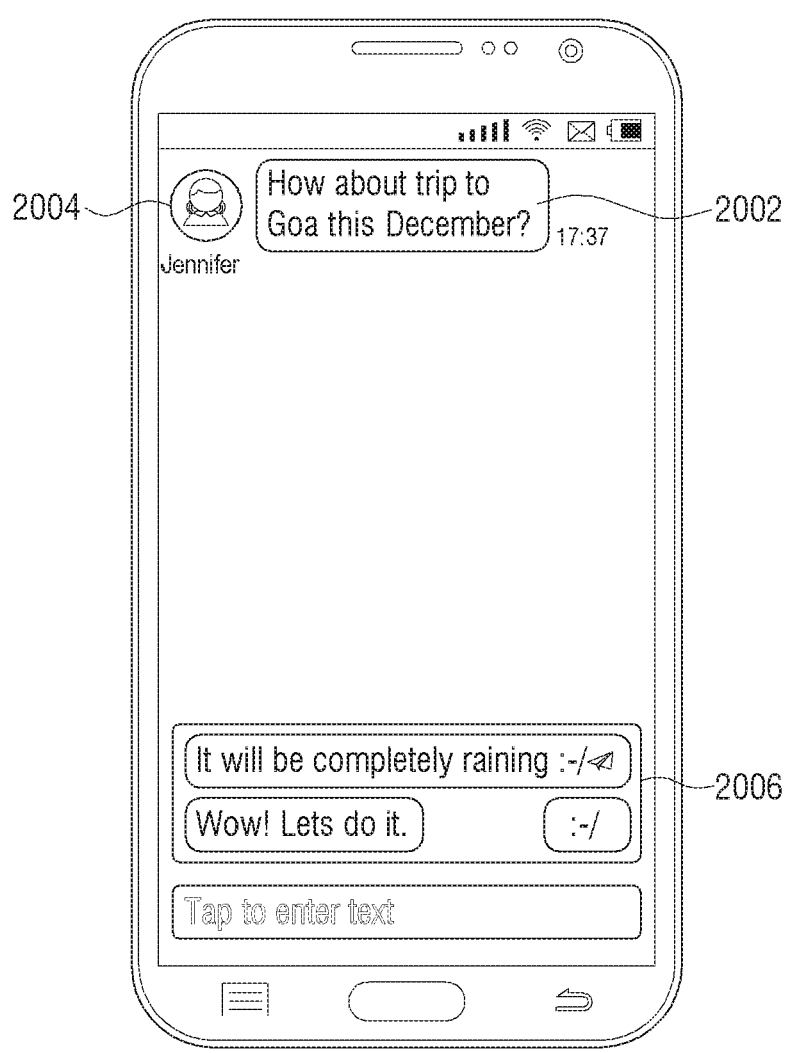
FIGS. 20A to 20C illustrate the UI displaying predicted response based on the context associated with the user and the electronic device, according to an embodiment of the present disclosure.
Figure 20B:
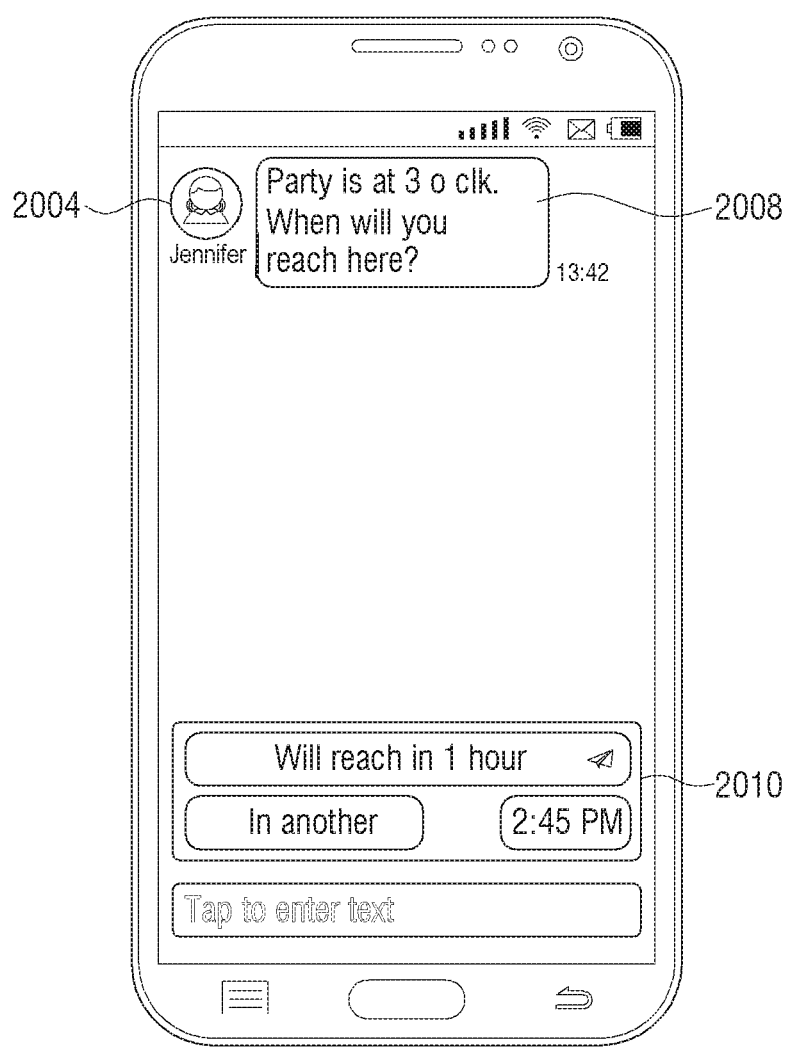
Figure 20C:
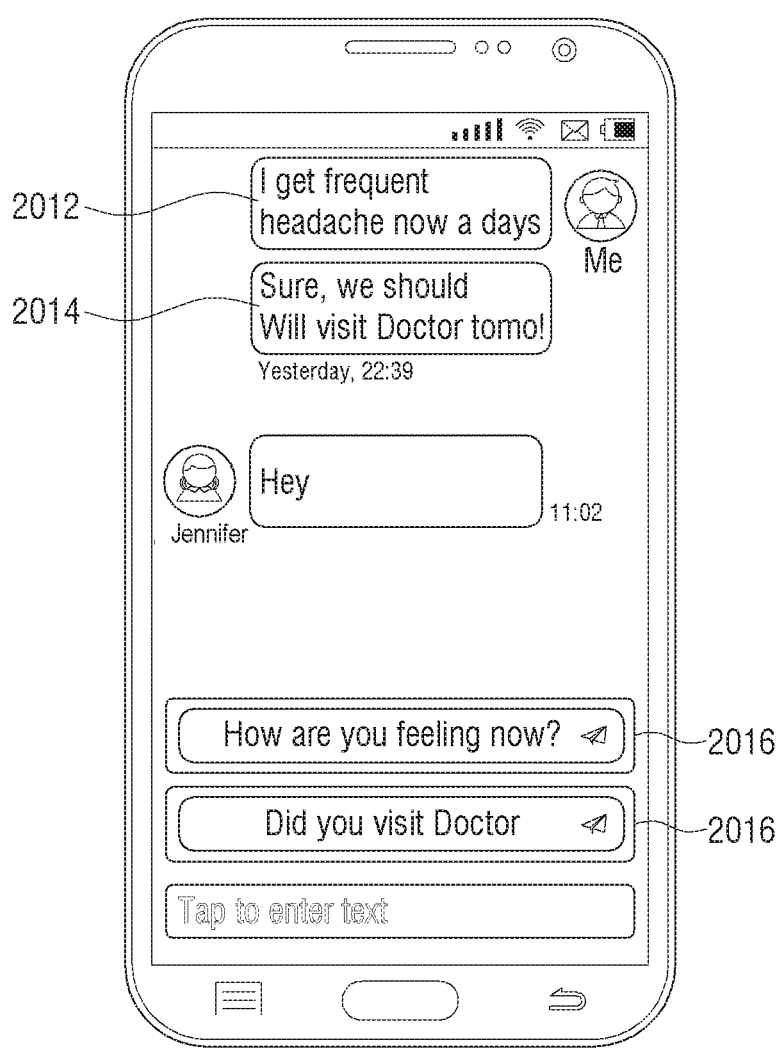

FIGS. 20A to 20C illustrate a UI displaying predicted response based on the context associated with the user and the electronic device, according to an embodiment of the present disclosure.

For example, consider a scenario in which the user of the electronic device 100 may receive at least one message 2002 from the at least one participant 2004. Unlike to conventional methods and systems, the proposed contextual category detector 130 can be used to identify the context (i.e., location, weather condition, etc.,) of the electronic device 100 or a user context (i.e., appointment, user tone, reminder, etc.).

Hence, based on the context of the electronic device 100 the response predictor 140 can be configured to predict, prioritize and display multiple responses. For example, if the content of the message 2002 includes "How about trip to Goa this December?", then the response predictor 140 can be configured to provide the response predictions 2006 i.e., "Wow! Let's do it". Further, the response predictions 2006 can include the response predicted based on the context (weather forecast provided by weather application, or weather forecast provided by any other means) of the electronic device 100 i.e., "it will be completely raining."

Further, if the content of message 2008 includes "party is at 3. When will you reach here?", then based on the context (e.g., location, time, or the like) of the electronic device 100 the response predictor 140 can be configured to predict, prioritize and display multiple responses 2010 i.e., "will reach in one hour", "In another", 2:45 PM", or the like.

Furthermore, if the content of message 2012 includes "I get frequent headache now a days" and content of message 2014 includes "Will visit doctor tomo!", then based on the context (e.g., time) of the electronic device 100 and context of at least one participant/user (i.e., Appointment, health, user tone, or the like) the response predictor 140 can be configured to predict, prioritize and display multiple responses 2016 i.e., "How are you feeling now?", "Did you visit the doctor", or the like.

FIGS. 21A to 21D illustrate various tables tabulating the response predictions and next suggestive words for different samples of inputs, according to an embodiment of the present disclosure.

The electronic device 100 or method (for example, operations) according to various embodiments may be performed by at least one computer (for example, a processor 160) which executes instructions included in at least one program from among programs which are maintained in a computer-readable storage medium.

When the instructions are executed by a computer (for example, the processor 160), the at least one computer may perform a function corresponding to the instructions. In this case, the computer-readable storage medium may be the memory, for example.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

The instructions may include machine language codes created by a compiler, and high-level language codes that can be executed by a computer by using an interpreter. The above-described hardware device may be configured to operate as one or more software modules to perform the operations according to various embodiments of the present disclosure, and vice versa.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device for automatically predicting a response, the electronic device comprising:
  a display; and
  a processor configured to:
  receive, from at least one external device connected to the electronic device,
  a first message and a second message;
  control the display to display a user interface (UI) including the first message and the second message;
  identify, based on a semantic modelling, a first dialog act category of the first message;
  obtain at least one response for the first message based on the identified first dialog act category using a trained language model;
  control the display to display the at least one obtained response for the first message on the UI;
  in response to a touch input on the UI by a user for selecting the second message from among the displayed first message and the displayed second message being received while the at least one obtained response for the first message is displayed, identify, based on a semantic modelling, a dialog act category of the second message from among the displayed first message and the displayed second message;
  obtain at least one response message for the second message from among the displayed plurality of messages based on the identified dialog act category of the selected message using trained language model; and
  control the display to display the at least one obtained response message for the second message on the UI.

2. The electronic device of claim 1, wherein the dialog act category of the second message is automatically identified based on at least one context indicative.

3. The electronic device claim 1, wherein the second message comprises one of a topic selected from a written communication and a topic formed based on at least one input field available in an application.

4. The electronic device of claim 3, wherein, the second message is an input topic from a first application, the processor is further configured to:
  identify at least one contextual event associated with a second application, and
  obtain at least one response message for the input topic from the first application based on the at least one contextual event.

5. The electronic device of claim 4, wherein the at least one contextual event is a time bound event.

6. The electronic device of claim 4, wherein the at least one contextual event associated with the second application is determined based on at least one context indicative associated with the input topic from the first application, and
  wherein the at least one context indicative is determined based on at least one of content available in the input topic, context of the first application, user activities, and events defined.

7. The electronic device of claim 1, wherein the second message and the at least one obtained response message are displayed within a notification area.

8. A method for automatically predicting a response, the method comprising:
- receiving, by an information manager from at least one external device connected to an electronic device, a first message and a second message at the electronic device;
- controlling a display of the electronic device to display a user interface (UI) including the first message and the second message;
- identifying, based on a semantic modelling, a first dialog act category of the first message;
- obtaining at least one response for the first message based on the identified first dialog act category using a trained language model;
- controlling the display to display the at least one obtained response for the first message on the UI;
- in response to a touch input on the UI by a user selecting the second message from among the displayed first message and the displayed second message being received, identifying, by a contextual category detector including a semantic modelling manager, a dialog act category of the second message from among the displayed first message and the displayed second message;
- obtaining, by a response predictor, at least one response message for the second message from among the displayed plurality of messages based on the identified dialog act category of the second message using the trained language model; and
- causing, by the response predictor, to display the at least one obtained response message for the second message on the UI.

9. The method of claim 8, wherein the dialog act category of the second message is automatically identified based on at least one context indicative.

10. The method of claim 8, wherein the second message comprises one of a topic selected from a written communication and a topic formed based at least one input field available in an application.

\* \* \* \* \*